US006738181B1

(12) United States Patent
Nakamoto et al.

(10) Patent No.: US 6,738,181 B1
(45) Date of Patent: May 18, 2004

(54) OPTICAL SENDING APPARATUS AND CHANNEL EXTENSION METHOD

(75) Inventors: Hiroshi Nakamoto, Kawasaki (JP); Takao Naito, Kawasaki (JP); Terumi Chikama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/650,856

(22) Filed: Aug. 29, 2000

(30) Foreign Application Priority Data

Sep. 28, 1999 (JP) .......................................... 11-274735

(51) Int. Cl.⁷ ............................................. H04B 10/12
(52) U.S. Cl. ............... 359/337; 359/337.12; 359/337.5; 359/349; 359/122
(58) Field of Search ........................... 359/337, 337.12, 359/337.5, 349, 122, 124, 154, 161, 173, 180

(56) References Cited

U.S. PATENT DOCUMENTS

| | | | | |
|---|---|---|---|---|
| 5,596,448 A | | 1/1997 | Onaka et al. ................ 359/341 |
| 6,014,249 A | * | 1/2000 | Fermann et al. ............. 359/333 |
| 6,021,235 A | * | 2/2000 | Yamamoto et al. ......... 359/124 |
| 6,236,495 B1 | * | 5/2001 | Moeller ........................ 359/161 |
| 6,271,948 B1 | * | 8/2001 | Toyohara ..................... 359/127 |
| 6,275,314 B1 | * | 8/2001 | Ishikawa ..................... 359/124 |
| 6,275,329 B1 | * | 8/2001 | Sieben .................. 359/337.15 |
| 6,339,665 B1 | * | 1/2002 | Danziger ..................... 359/161 |
| 6,342,961 B1 | * | 1/2002 | Bergano et al. ............. 359/122 |
| 6,407,842 B1 | * | 6/2002 | Ma ............................... 359/124 |
| 6,411,413 B1 | * | 6/2002 | Bergano ...................... 359/124 |
| 6,459,515 B1 | * | 10/2002 | Bergano ...................... 359/124 |

OTHER PUBLICATIONS

Wang, L.J. et al. "Analysis of Polarization-Dependent Gain in Fiber Amplifiers," IEEE J of Quantum Elec. vol. 34, No. 3, Mar. 1998. pp. 413–418.*
Golovchenko, E.A. et al. "Four-Wave Mixing in Multispan Dispersion-Managed Transmission Lnks," IEEE Photonics Tech. Lett., Vol 10, No 10, Oct. 1998. pp 1481–1483.*
Lucent Technologies-Bell Labs Innovations Catalog, "Erbium Doped Polarization Maintaining Fiber" Specialty Fiber Devices, p PS-21, Jul. 1999.*
Patent Abstracts of Japan of JP Hei 8-95095 dated Apr. 12, 1996.

* cited by examiner

Primary Examiner—Thomas G. Black
Assistant Examiner—Stephen Cunningham
(74) Attorney, Agent, or Firm—Staas & Halsey LLP

(57) ABSTRACT

An optical sending apparatus of this invention includes a plurality of optical signal generating sections, a dispersion compensating section and a wavelength multiplexing section. The dispersion compensating section performs compensation with a predetermined chromatic dispersion value to at least one of polarized light generated by the optical signal generating sections while a predetermined state of polarized light is maintained. The wavelength multiplexing section combines output light outputted from the optical signal generating section with output light passing through the dispersion compensating section so that the polarized light of adjacent wavelengths crosses orthogonal to each other. The optical sending apparatus having such a construction can generate high-density WDM optical signals, the dispersion of which is compensated in advance, by a polarization crossing method.

47 Claims, 8 Drawing Sheets

FIG. 8
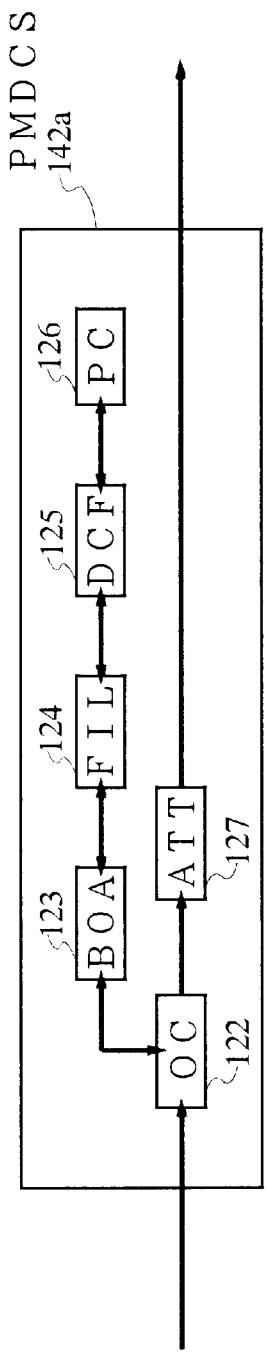
A.
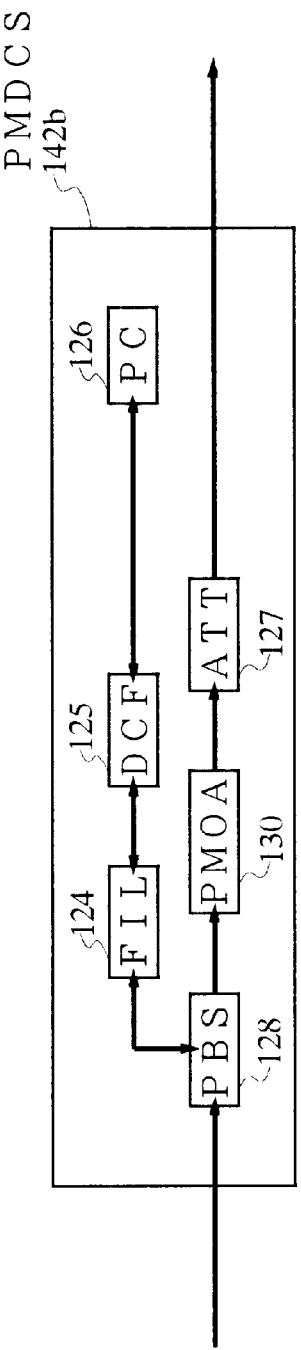
B.

OPTICAL SENDING APPARATUS AND CHANNEL EXTENSION METHOD

BACKGROUND OF THE INVENTION

1. Field of the Invention

In an optical sending apparatus for generating wavelength-division multiplexing optical signals by a polarization crossing method, this invention relates to an optical sending apparatus that compensates in advance for a chromatic dispersion occurring in the wavelength-division multiplexing optical signals in an optical transmission line. The present invention relates also to a channel extension method for extending afresh channels for the wavelength-division multiplexing optical signal.

To build up a future multimedia network, an ultra-long distance, high capacity optical transmission system has been required at present. A wavelength-division multiplexing (hereinafter called "WDM") system has been examined as a system for achieving a large capacity due to the advantages of this system in that the system can utilize effectively a broadband large capacity of an optical fiber.

Particularly recently, the capacity of WDM optical signals must be increased so as to cope with the increase of traffic. It has therefore become necessary to narrow the spaces between the optical signals (channels) of the WDM optical signals to achieve a high density of the WDM optical signals.

2. Description of the Related Art

The WDM optical signals sent from a sending station deteriorate before they are received by a receiving station due to non-linear optical phenomena such as four-wave mixing, cross-phase modulation, and so forth, that develop in an optical transmission line such as an optical fiber. Four-wave mixing and mutual phase modulation exert greater influences on degradation of the optical signals when the spaces are smaller between the optical signals interacting with each other and when their polarization conditions are closer to each other.

Therefore, the WDM optical signals are subjected to a process that non-polarizes time-wise the polarization condition or a polarization crossing method that causes the optical signal in the polarization condition of the adjacent channels to cross orthogonal to each other, before they are outputted to the optical transmission line.

In this non-polarization process, polarization scrambler that changes time-wise retardation of mutually crossing polarization components non-polarizes the WDM optical signal. The polarization crossing method generates the optical signal corresponding to each channel under the same polarization condition. Each optical signal is guided by a polarization-maintaining fiber (hereinafter called "PMF") to an optical multiplexer (hereinafter called "MUX"). When this PMF is connected to MUX, each PMF is connected to MUX in such a fashion that a stress-imparted portion of each PMF crosses orthogonal to that of other between PMF for transferring the adjacent channels. As a result, the WDM optical signal by the polarization crossing method is generated.

When the spaces between the optical signals of the WDM optical signals in the non-polarization method are too small, however, phase modulation by the polarization scrambler broadens the spectrum of each optical signal with the result of the occurrence of cross-talk between the adjacent optical signals. A band-pass optical filter in the receiving station, the center wavelength of the bandwidth of which is brought into conformity with the wavelength received by an optical receiver, removes the broadened spectrum component. In consequence, the reception sensitivity deteriorates. For these reasons, it is not easy to apply the non-polarization process using the polarization scrambler to the high-density WDM optical signals having the narrowed spaces.

On the other hand, chromatic dispersion develops in the WDM optical signals sent from the sending station through the optical transmission line such as the optical fiber before they are received by the receiving station. Several methods are known for compensating this chromatic dispersion, such as a method that provides a dispersion compensator having a chromatic dispersion value having an opposite sign to that of the chromatic dispersion value occurring in the optical transmission line to the optical sending station or to the optical receiving station, and a method that divides the chromatic dispersion occurring in the optical transmission line at a suitable ratio, allocates them to two dispersion compensators, provides these dispersion compensators to the optical sending station connected to the input terminal of the optical transmission line and to the optical receiving station connected to the output terminal of the optical transmission line.

Japanese Unexamined Patent Application Publication No. Hei 8-095095 discloses a dispersion compensator that compensates the chromatic dispersion without causing the influences of the polarization mode dispersion.

In the polarization crossing method, since it is necessary to maintain the polarization condition even after compensation of the dispersion until multiplexing is done by MUX. Therefore, the dispersion compensation fiber must maintain the polarization condition. Since the dispersion compensation fiber is generally elongated, however, a polarization extinction ratio remarkably deteriorates. Further, a dispersion compensation fiber capable of maintaining the polarization is difficult to produce.

The elongated dispersion compensation fiber invites a remarkable loss in the propagating optical signal, and remarkably deteriorates the optical signal-to-noise ratio of the optical signal.

SUMMARY OF THE INVENTION

It is an object of the present invention to provide an optical sending apparatus capable of generating WDM optical signals with a polarization crossing method dispersion of which is compensated in advance.

It is another object of the present invention to provide a channel extension method for extending channels afresh in WDM optical signals generated by the polarization crossing method.

These objects can be accomplished by an optical sending apparatus including a plurality of optical signal generating sections, a dispersion compensating section and a wavelength multiplexing section, wherein the dispersion compensating section gives a predetermined chromatic dispersion to at least one of a plurality of polarized light generated by the optical signal generation sections, while maintaining a predetermined state of polarized light. And the wavelength multiplexing section combines output light outputted from the optical signal generating sections with each other, or combines these output light and the output light passing through the dispersion compensating section in such a fashion that polarized light of adjacent wavelengths as the output cross orthogonal to each other.

The dispersion compensating section comprises, for example, an optical device for outputting light inputted to a first port to a second port, and outputting light inputted to the second port to a third port, a dispersion compensating device having a predetermined dispersion value and connected to the second port of the optical device, and a polarization converting section for having input polarized light outputted from the dispersion compensating device, rotating polarized light as the output of the dispersion compensating device and inputting it again to the dispersion compensating device.

Optical components such as an optical amplifier, a bandpass filter or an optical attenuator may be interposed between the optical device and the polarization converting section. Optical components such as an optical amplifier, an optical attenuator or a polarizer, each capable of maintaining polarization, may be interposed between the optical device and the wavelength multiplexing section.

The objects described above can be accomplished also by a channel extension method for multiplexing an optical signal having wavelengths which are on either the short or the long wavelength side of the wavelength band of the WDM optical signal, wherein the wavelengths are a predetermined space away from an outer edge of the wavelength band, with a WDM optical signal, after dispersion-compensating it. The multiplexing is done in such a fashion that the optical signal in the polarization condition crosses orthogonal to the optical signal of the WDM optical signal which is in the polarization condition and has the closest wavelength to that of the optical signal which was dispersion-compensated.

The optical sending apparatus having such a construction can generate high-density WDM optical signals generated by the polarization crossing method, the dispersion of which is compensated in advance. The optical communication system using this optical sending apparatus can transmit the signals for a long distance by transmitting the WDM optical signals generated by the polarization crossing method, the dispersion of which is compensated in advance.

Since the channel extension method extends the channels in such a fashion as to cross orthogonal to the existing WDM optical signal with predetermined spaces between each of the channels, this method can suppress polarizing-hole burning and the non-linear optical effects even after the channels are extended.

Furthermore, the dispersion compensating section can suppress degradation of the optical signal-to-noise ratio resulting from the dispersion-compensating fiber. It is particularly suitable for dispersion-compensating the WDM optical signal generated by the polarization crossing method.

Here the further objects and features of the invention will become apparent from the following description to be made with reference to the accompanying drawings.

BRIEF DESCRIPTION OF THE DRAWINGS

The nature, principle, and utility of the inventions will become more apparent from the following detailed description when read in conjunction with the accompanying drawings in which like parts are designated by identical reference numbers, in which:

FIG. 8 is a block diagram showing the construction of a polarization-maintaining dispersion compensating section of the fifth embodiment.

DESCRIPTION OF THE PREFERRED EMBODIMENTS

Figure 1:
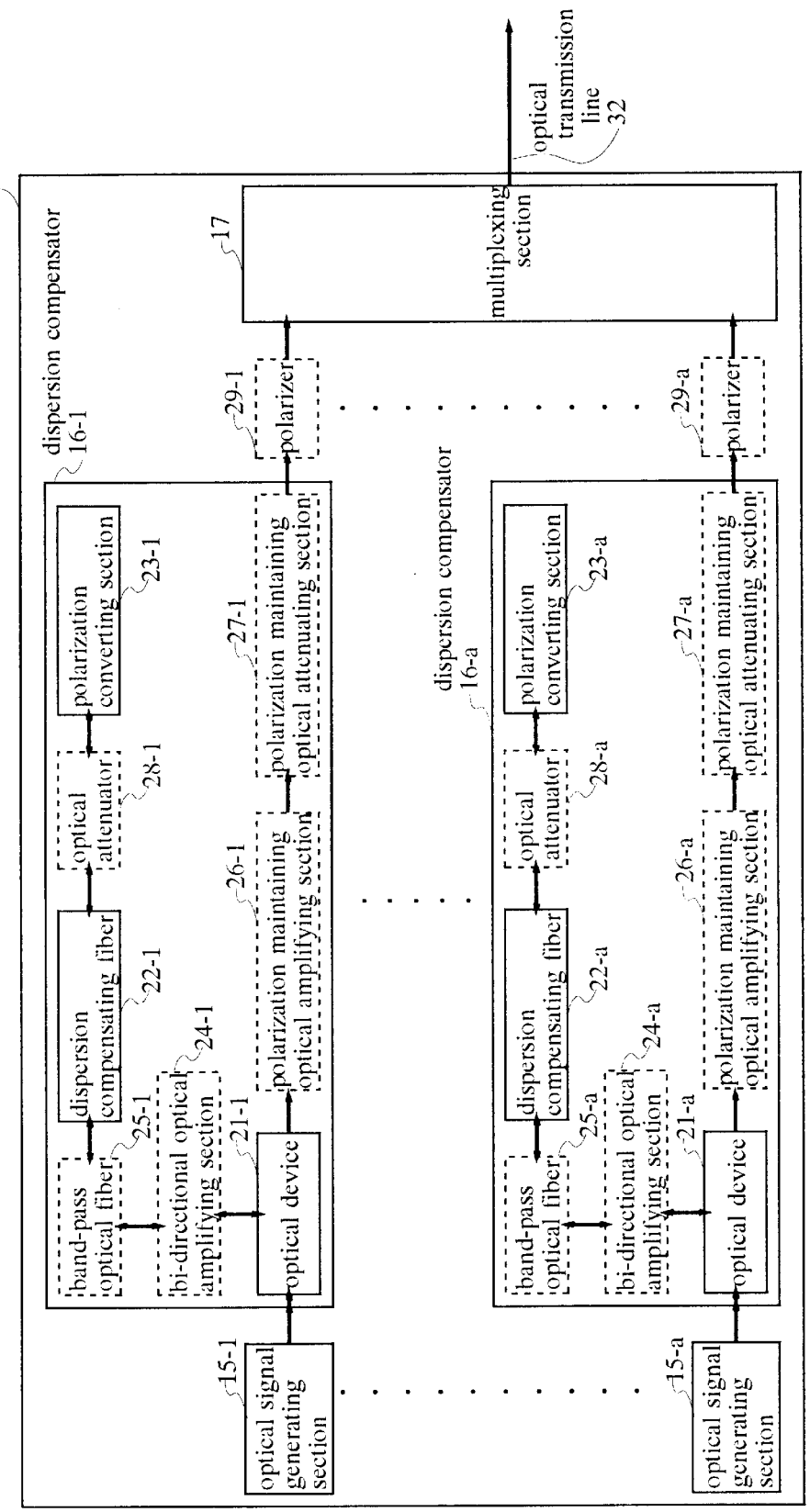
FIG. 1 is a block diagram showing the construction of an optical sending apparatus according to the first embodiment.

Embodiments of the invention will be described with reference to the accompanying drawings. In these Figures, the same constructions are designated by the same reference numerals, and their repeated description may be omitted.

First Embodiment

The first embodiment of this invention relates to an optical sending apparatus.

Referring initially to FIG. 1, a plurality of signal generating sections 15 generate optical signals that are specific, linearly polarized waves and have mutually different wavelengths. Each optical signal so generated is inputted to a first port of a plurality of optical devices 21 each having first to third ports.

The optical device 21 outputs light, that is inputted to its first port, from the second port, and outputs also light, that is inputted to the second port, from the third port. Therefore, each optical signal inputted to the first port is outputted from the second port of each optical device 21, and is inputted to a plurality of dispersion compensating fibers 22, respectively.

The length of the dispersion compensating fiber 22 is determined so as to achieve a chromatic dispersion value that is a half of a predetermined dispersion compensating value to be compensated. This predetermined chromatic dispersion value has an opposite sign to the chromatic dispersion value that is generated by the optical signal inputted to the dispersion compensating fiber 22 in an optical transmission line 32 connected to the optical sending apparatus 11. The chromatic dispersion value of the dispersion compensating fiber 22-1, for example, has an opposite sign to the chromatic dispersion value that the optical signal generated in the optical signal generating section 15-1 generates in the optical transmission line 32.

The optical signal outputted from each dispersion compensating fiber 22 is inputted to a plurality of polarization converting sections 23. Each polarization converting section 23 converts the light outputted from the dispersion compensating fiber 22 to light in the polarization condition that crosses orthogonal to the former in the polarization condition and is time-reversed. The polarization converting section 23 inputs once again the light so converted to the dispersion compensating fiber 22.

A multiplexing section 17 is connected to the third port of each optical device 21. The multiplexing section 17 multiplexes each optical signal so that the polarization conditions of the optical signals, the wavelengths of which are adjacent to each other, cross orthogonal to one another among the optical signals outputted from the third ports.

Function and Effect of the First Embodiment

In the optical sending apparatus 11 having the construction described above, polarization fluctuation does not develop even when each optical signal generated in the optical signal generating section 15 transmits through the dispersion compensating fiber 22. Therefore, when multiplexing these optical signals at the multiplexing section 17, the optical sending apparatus 11 can acquire the WDM optical signals generated by the polarization crossing method, the chromatic dispersion of which is compensated.

Next, the reason why the chromatic dispersion can be compensated without polarization fluctuation will be explained.

Generally, when light propagates through the optical fiber, the polarization condition of this light changes due to double refraction of the optical fiber. When the light is decomposed into the orthogonal polarization components, the amount of change of the polarization condition is based on the retardation of the two components that are decomposed.

It will be assumed hereby that an x-y-z rectangular coordinate system is set with a z axis representing the propagating direction of the light propagating through the optical fiber, and with x and y axes being set inside the section of the optical fiber that crosses orthogonal to the z axis. In this case, arbitrary light can be decomposed into x and y polarization components. When $n_x$ and $n_y$ represent refractive index of the x and y axes, respectively, the retardation of the x and y polarization components is proportional to $(n_x-n_y)$.

Outgoing light propagating through the dispersion compensating fiber 22 is outputted to the polarization converting section 23 with retardation that is proportional to $(n_x-n_y)$. The polarization converting section 23 rotates the polarization condition of this light by 90 degrees and time-reverses it. The polarization converting section 23 inputs again this light to the dispersion compensating fiber 22. The time is hereby reversed because the propagating direction of the light becomes opposite between the outgoing route and the returning route. Therefore, light of the returning light propagating through the dispersion compensating fiber 22 comes to possess retardation proportional to $-(n_x-n_y)$ and is outputted to the second port of the optical device 21.

Therefore, the retardation of the x and y polarization components of the light outgoing and returning through the dispersion compensating fiber 22 is expressed by $(n_x-n_y)-(n_x-n_y)=0$.

In other words, the optical sending apparatus 11 can output the optical signal, the polarization dispersion and chromatic dispersion of which are compensated, from the third port of the optical device 21 by using the ordinary dispersion compensating fiber 22 in which polarization dispersion occurs.

The characterizing feature in this case is as follows. When the system design of the optical devices, in which polarization dispersion occurs, such as the dispersion compensating fiber, the optical amplifier, the optical filter and the optical attenuator, is made so that the light after passing through these optical devices is again inputted by rotating the polarization direction by 90 degrees, the polarization dispersion can be neglected.

As described above, the optical signal the chromatic dispersion of which is to be compensated goes and returns through the dispersion compensating fiber and the optical amplifier or the optical attenuator. Therefore, target predetermined values can be acquired for the dispersion value and the gain or the attenuation quantity of these devices when the length of the ordinary dispersion compensating fiber is set to a length that is substantially a half of the length when the light is allowed to propagate in only one direction.

Referring back again to FIG. 1, a dispersion compensator 16 may include an optical device 21 that has first to third ports, outputs the light inputted to the first port thereof from the second port and outputs the light inputted to the second port thereof from the third port, a band-pass optical filter 25 that is connected to the second port of the optical device 21 and transmitting light having a predetermined wavelength, a dispersion compensating fiber 22 that is connected to the band-pass optical filter 25 and the length of which is so set as to attain a chromatic dispersion value which is a half of the predetermined dispersion compensation value to be compensated, and a polarization conversing section 23 that is connected to the dispersion compensating fiber 22, converts the light of the dispersion compensating fiber 22 to the light in the polarization condition that crosses orthogonal to the light in the polarization condition of the dispersion compensating fiber 22 and is time-reversed, and inputs this light again to the dispersion compensating fiber 22.

In the dispersion compensator 16 having such a construction, polarization fluctuation does not occur even when the inputted light transmits through the dispersion compensating fiber 22. The dispersion compensator 16 can remove the wavelength components other than the light having to a the predetermined wavelength by means of the band-pass optical filter 25.

Next, another embodiment of the present invention will be explained.

Second Embodiment

The second embodiment relates to an optical sending apparatus.

Figure 2:
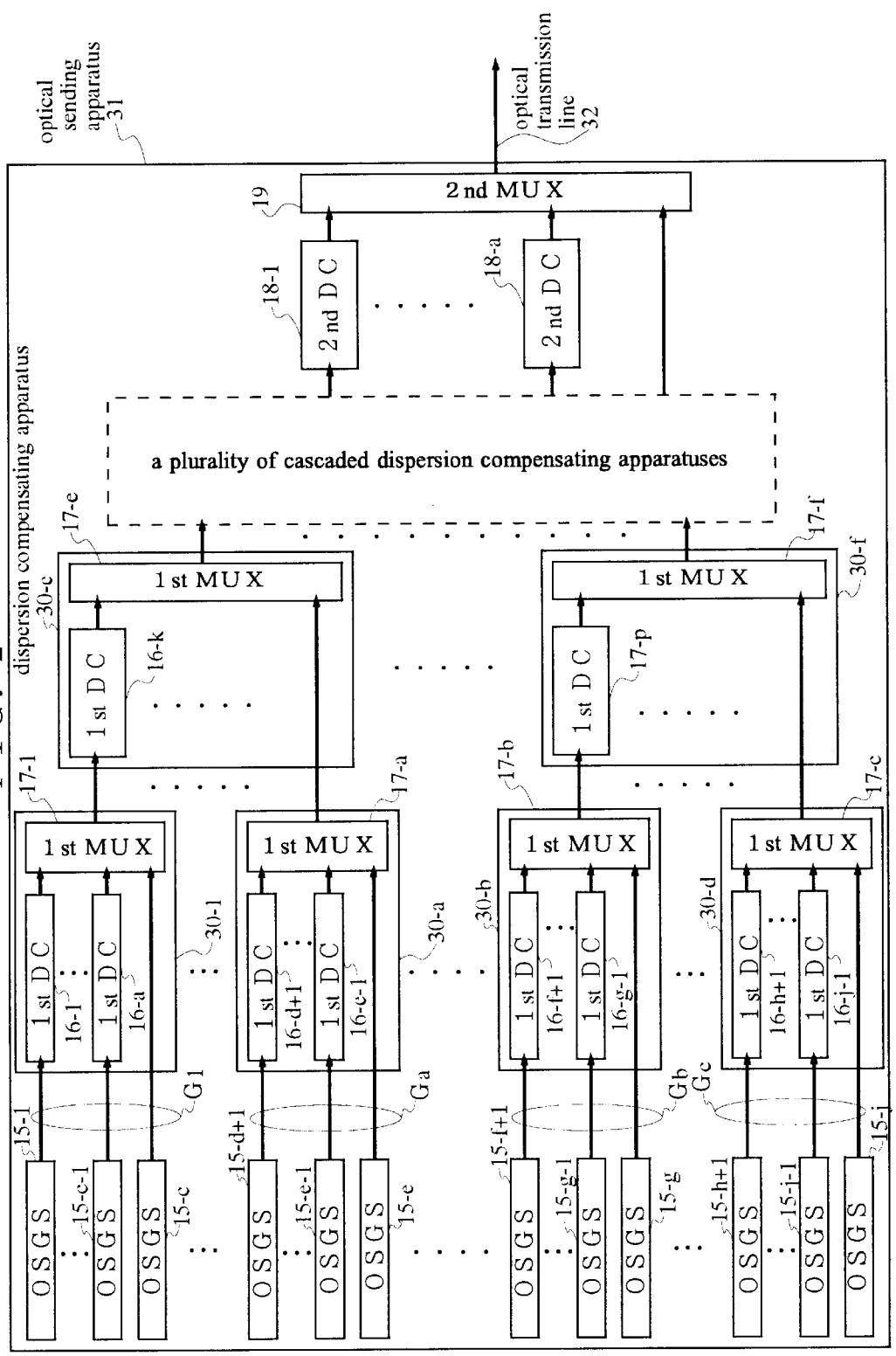
FIG. 2 is a block diagram showing the construction of an optical sending apparatus according to the second embodiment.

Referring to FIG. 2, the optical signals of a plurality of optical signal generating sections (OSGS) 15 are divided into a plurality of groups such as G1 to Gc in FIG. 2. In one divided group, each optical signal other than a specific optical signal is inputted to a plurality of dispersion compensators 16. Inside G1, for example, each optical signal other than a specific optical signal, that is generated by the optical signal generating section 15-c, is inputted to the dispersion compensators 16-1 and 16-a. Each dispersion compensator 16 compensates the chromatic dispersion of each optical signal inputted thereto by the difference of the dispersion compensation value for compensating for the chromatic dispersion of the specific optical signal and the dispersion compensation value for compensating for the chromatic dispersion of the each optical signal.

In each divided group, the optical signal outputted from each dispersion compensator 16 and the specific optical signal are inputted to the wavelength multiplexing section 17. In G1, for example, these optical signals are inputted to the wavelength multiplexing section 17-1. In Ga, for example, these optical signals are inputted to the wavelength multiplexing section 17-a. The number of the wavelength multiplexing sections 17 is in agreement with the number of the groups. The wavelength multiplexing section 17 wavelength-multiplexes these optical signals so that the optical signals in the polarization conditions having adjacent wavelengths cross orthogonal to each other among the optical signals so inputted.

Incidentally, FIG. 2 shows the dispersion compensator 16 as the first dispersion compensator(first DC) for the sake of the later-appearing explanation.

In FIG. 2, the optical sending apparatus 31 is constituted as a plurality of dispersion compensating apparatuses 30 are cascaded in the multiplexing section.

Here, a plurality of optical signals inputted to the dispersion compensating apparatuses 30 cascaded in multiple stages are wavelength-multiplexed optical signals that are outputted from the dispersion compensating apparatus 30 of preceding stages. In FIG. 2, a plurality of optical signals inputted to the dispersion compensating apparatus 30-e, for example, are the optical signals outputted from the dispersion compensating apparatuses 30-1 to 30-a of the preceding stages, and they are divided into a plurality of groups.

The WDM optical signal of each first wavelength multiplexing section 17 is inputted to a plurality of second dispersion compensators(second DC) 18. Each of the second dispersion compensators 18 compensates the chromatic dispersion of each WDM optical signal by the dispersion compensation value for compensating the chromatic dispersion of the specific optical signal in the group of the inputted WDM optical signals.

The WDM optical signal outputted from each second dispersion compensator 18 is inputted to the second wavelength multiplexing section(second MUX) 19. The second wavelength multiplexing section 19 further wavelength-multiplexes each of these WDM optical signals so that the channels in the polarization conditions having adjacent wavelengths cross orthogonal to each other, among the channels of the inputted WDM optical signals.

Function and Effect of the Second Embodiment

Generally the optical signal loses its power while the optical signal propagates through optical components, lowering thereby the optical signal-to-noise ratio. Therefore, an optical component having a large loss must be divided into two segments. An optical amplifier must be used to amplify the optical signal between the segments.

Even when the dispersion compensating fiber gets elongated in order to acquire a predetermined chromatic dispersion value of a certain optical signal, the dispersion compensating apparatus 30 having such a construction compensates the predetermined chromatic dispersion value while it is divided. Therefore, this dispersion compensating apparatus 30 can restrict the elongation of the dispersion compensating fiber. In other words, it can keep the loss of the dispersion compensating fiber within a predetermined range of allowance. Even when compensating the chromatic dispersion of the optical signal, the dispersion compensating apparatus 30 can keep a satisfactory optical signal-to-noise ratio.

Referring to FIG. 2, the optical sending apparatus 31 comprises a dispersion compensator formed by cascading a plurality of dispersion compensating apparatuses 30, a plurality of optical signal generating sections 15 for generating each optical signal to be inputted to the dispersion compensating apparatus 30 of the initial stage, a plurality of second dispersion compensator 18 to which the WDM optical signals outputted from each wavelength multiplexing section 17 of the final stage are inputted and which compensates the chromatic dispersion of the WDM optical signal by the dispersion compensation value for compensating for the chromatic dispersion of the specific optical signal, and the second wavelength multiplexing sections 19 to which the WDM optical signal outputted from each second dispersion compensator 18 is inputted and which further wavelength-multiplexes each WDM optical signal so that the channels in the polarization conditions having adjacent wavelengths cross orthogonal to each other, among the channels of the inputted WDM optical signals.

Even when the dispersion compensating fiber gets elongated in order to acquire a predetermined chromatic dispersion value of a certain optical signal of a WDM optical signal, the optical sending apparatus 31 having such a construction compensates the predetermined chromatic dispersion value while it is divided. Therefore, this optical sending apparatus 31 can restrict the elongation of the dispersion compensating fiber. In other words, it can keep the loss of the dispersion compensating fiber within a predetermined range of allowance. Even when compensating the chromatic dispersion of the optical signal of the WDM optical signal, the optical sending apparatus 31 can keep a satisfactory optical signal-to-noise ratio.

In FIGS. 1 and 2, the first and second dispersion compensators 16 and 18 may comprise an optical device 21 to which the light to be inputted to the dispersion compensators 16 and 18 is inputted, and which has a first port for outputting the inputted light to a second port and a third port for outputting the light inputted to the second port, a dispersion compensating fiber 22 which is connected to the second port of the optical device 21 and the length of which is set so as to achieve a chromatic dispersion value that is a half of a predetermined dispersion compensation value to be compensated, and a polarization converting section 23 which is connected to the dispersion compensating fiber 22, converts the light outputted from the dispersion compensating fiber 22 to the light under the polarization condition that crosses orthogonal to the output light in the polarization condition and is time-reversed, and inputs again this light to the dispersion compensating fiber.

The optical sending apparatus 31 having such a construction is free from the polarization fluctuation even when each optical signal generated by the optical signal generating section 15 transmits through the dispersion compensating fiber 22. Therefore, the optical sending apparatus 31 wavelength-multiplexes each optical signal free from the polarization fluctuation in the wavelength-multiplexing sections 17 and 19, and can acquire the WDM optical signals, the chromatic dispersion of which is compensated, by the polarization crossing method.

In FIGS. 1 and 2, the optical sending apparatuses 11 and 31 may further include a bi-directional optical amplifying section 24 connected between the second port of the optical device 21 and the dispersion compensating fiber 22. The bi-directional optical amplifying section 24 has two input/output ports, amplifies the light inputted to one of the input/output ports, and outputs the light so amplified from the other of the input/output ports. Similarly, it outputs also the light inputted to the other of the input/output ports from one of the input/output ports after optical amplification.

In FIGS. 1 and 2, the optical sending apparatuses 11 and 31 may further include a polarization-maintaining optical amplifying section 26 that is connected to the third port of the optical device 21. The polarization-maintaining optical amplifying section 26 amplifies the inputted light while maintaining its polarization condition.

The optical sending apparatuses 11 and 31 having such a construction can compensate the loss occurring in the optical device 21, the dispersion compensating fiber 22 and the polarization converting section 33.

When amplified by the optical amplifiers cascaded in multiple stages, the optical signal having a constant polarization condition undergoes generally polarizing-hole burning. This polarizing-hole burning is the phenomenon in which the polarization component of a noise crossing orthogonal to the optical signal is amplified with the result of the deterioration of the optical signal-to-noise ratio. In the optical sending apparatuses 11 and 31, however, the light in the polarization condition, of inputted to one of the input/output ports, crosses orthogonal to the light in the polarization condition inputted to the other input/output ports. Therefore, the amplified light after suppression of polarizing-hole burning can be outputted from the third port of the optical device 21.

In FIGS. 1 and 2, the optical sending apparatuses 11 and 31 may further comprise a plurality of polarization-maintaining optical attenuating sections 27 that are connected to the third port of the optical device 21. The polarization-maintaining optical attenuating section 27 attenuates the inputted light while keeping its polarization condition.

The optical sending apparatuses 11 and 31 having such a construction can regulate the level of each optical signal in the WDM optical signal by the polarization-maintaining optical attenuating section 27, and can therefore pre-emphasize the WDM optical signal.

In FIGS. 1 and 2, the optical sending apparatuses 11 and 31 may further comprise an optical attenuator 28 between the dispersion compensating fiber 22 and the polarization converting section 23.

In FIGS. 1 and 2, the optical sending apparatuses 11 and 31 may further comprise a band-pass optical filter 25 connected between the second port of the optical device 21 and the dispersion compensating fiber 22. The center wavelength of the pass wavelength band of this band-pass optical filter 25 is set to the wavelength of the optical signal generated by the optical signal generating section 15 that is connected to the first port of the optical device 21. In the case of the band-pass optical filter 25-1, for example, the center wavelength of the pass wavelength band is set to the wavelength of the optical signal generated by the optical signal generating section 15-1 that is connected to the first port of the optical device 21-1.

The optical sending apparatuses 11 and 31 having such a construction cut off the light other than the optical signal generated by the optical signal generating section 15, and can therefore send reliably the WDM optical signal having the optical signal set to the desired wavelength.

In FIGS. 1 and 2, the optical sending apparatuses 11 and 31 may further include a bi-directional optical amplifying section 24 connected between the second port of the optical device 21 and the dispersion compensating fiber 22, and a polarization-maintaining optical attenuating section 27 connected to the third port of the optical device 21.

In FIGS. 1 and 2, the optical sending apparatuses 11 and 31 may further include a polarization-maintaining optical amplifying section, 26 connected to the third port of the optical device 21 and a polarization-maintaining optical attenuating section 27 connected to the polarization-maintaining optical amplifying section 26.

The polarization-maintaining optical amplifying section 26 amplifies the inputted light while maintaining its polarization condition, and outputs the optical signal so amplified to the polarization-maintaining optical attenuating section 27. The polarization-maintaining optical attenuating section 27 attenuates the inputted light while maintaining its polarization condition, and outputs the optical signal so attenuated to the wavelength multiplexing section 17.

In FIGS. 1 and 2, the optical sending apparatuses 11 and 31 may further include a bi-directional optical amplifying section 24 connected to the second port of the optical device 21, a band-pass optical filter 25 connected between the bi-directional optical amplifying section 24 and the dispersion compensating fiber. 22, and a polarization-maintaining optical attenuating section 27 connected to the third port of the optical device 21.

In FIGS. 1 and 2, the optical sending apparatuses 11 and 31 may further include a band-pass optical filter 25 connected between the second port of the optical device 21 and the dispersion compensating fiber 22, a polarization-maintaining optical amplifying section 26 connected to the third port of the optical device 21, and a polarization-maintaining optical attenuating section 27 connected to the polarization-maintaining optical amplifying section 26.

The output of the polarization-maintaining optical amplifying section 26 is inputted to the polarization-maintaining optical attenuating section 27, and the output of the polarization-maintaining optical attenuating section 27 is inputted to the wavelength multiplexing section 17.

In FIGS. 1 and 2, the optical sending apparatuses 11 and 31 comprise polarizers 29 capable of maintaining the polarization condition and connected between the optical device 21 and the wavelength multiplexing section 17, 17-1, 17-a, 17-b and 17-c.

When optical components for maintaining the polarization are connected in multiple stages, the polarization extinction ratio deteriorates, and transmission characteristics may deteriorate. Therefore, when the polarizers 29 are inserted, they can improve the polarization extinction ratio and can avoid deterioration of the transmission characteristics.

The optical communication system may comprise the optical sending apparatuses 11 and 31 for generating the WDM optical signals for wavelength-multiplexing a plurality of optical signals, the optical transmission lines for transmitting the WDM optical signals outputted from the optical sending apparatuses 11 and 31, and optical receiving apparatuses for receiving and processing the WDM optical signals from the optical transmission lines.

Being capable of transferring the WDM optical signals by the polarization crossing method, the optical communication system having such a construction can reduce degradation resulting from the non-linear optical effect that occurs between the channels having adjacent wavelengths in the WDM optical signals. Since this optical communication system compensates in advance the chromatic dispersion by the optical sending apparatuses, it can allow the optical receiving apparatus to receive the WDM optical signals having suppressed degradation of the optical signals due to the chromatic dispersion. When a relay amplifier is interposed into the optical transmission line of this optical communication system, too, the WDM optical signals by the polarization crossing method are inputted to the optical amplifier inside the relay amplifier. In comparison with the WDM optical signals not relying on the polarization crossing method, therefore, polarizing-hole burning occurring in the optical amplifier can be much more suppressed.

In other words, since this optical communication system can suppress degradation occurring in the WDM optical signals during transmission, it can transmit the WDM optical signals in a long distance.

Next, a method of extending channels in such optical sending apparatuses 11 and 31 will be explained.

A channel extension method for extending the optical signals to an optical sender for generating WDM optical signals for wavelength-multiplexing a plurality of optical signals by the polarization crossing method comprises a first step of generating optical signals of a channel to be extended for the wavelength of either one of the short and long wavelength band sides of the wavelength band of the WDM optical signals, a second step of causing the resulting optical signals to propagate through a dispersion compensating fiber the length of which is so set as to achieve a half chromatic dispersion value of a predetermined dispersion compensation value to be compensated, a third step of converting the optical signals outputted from the dispersion compensating fiber to optical signals in the polarization condition which crosses orthogonal to the output optical signal in the polarization condition and is time-reversed, and then inputs again the signal to the dispersion compensating fiber, and a fourth step of wavelength-multiplexing the optical signal propagating again through the dispersion compensating fiber with the WDM optical signal so that it crosses orthogonal to the optical signal in the polarization condition, of the WDM optical signal having the closest wavelength to the wavelength of this optical signal.

A channel extension method for extending an optical signal for optical senders for generating WDM optical signals for wavelength-multiplexing a plurality of optical signals by the polarization crossing method may comprise a first step of generating the optical signal of a channel to be extended, that has wavelengths having spaces of at least 0.4 nm, on either one of the short and long wavelength sides of the wavelength band of the WDM optical signal, and a second step of wavelength-multiplexing the resulting optical signal with the WDM optical signal.

A channel extension method for extending optical signals to optical senders for generating WDM optical signals for wavelength-multiplexing a plurality of optical signals by the polarization crossing method may comprise a first step of generating an optical signal of a channel to be extended, that has wavelengths having a space of at least 0.4 nm on either one of the short and long wavelength sides of the signal wavelength band of the WDM optical signal, a second step of causing the resulting optical signal to propagate through a dispersion compensating fiber the length of which is so set as to achieve a half chromatic dispersion value of a predetermined dispersion compensation value to be compensated, a third step of converting the optical signal from the dispersion compensating fiber to an optical signal under the polarization condition which crosses orthogonal to the input optical signal in the polarization condition and is time-reversed, and inputting again the signal to the dispersion compensation fiber and a fourth step of causing the optical signal propagating again through the dispersion compensation fiber to cross orthogonal to the optical signal in the polarization condition, of the WDM optical signal having the closest wavelength to the wavelength of this optical signal, and wavelength-multiplexing it with the WDM optical signal.

According to such a channel extension method, the channel to be extended is extended in such a fashion that the channel in the polarization condition crosses orthogonal to the existing channels in the polarization condition. Therefore, this method can suppress the non-linear optical effect and polarizing-hole burning occurring in the WDM optical signal before and after a channel extension.

This channel extension method secures a space of at least 0.4 nm (50 GHz) between the channel to be extended and the existing channel having the closest wavelength to the wavelength of the former. Therefore, this method can more reliably suppress the non-linear optical effect and polarizing-hole burning that occur in the WDM optical signal.

Next, still another embodiment of the present invention will be explained.

Third Embodiment

Figure 3:
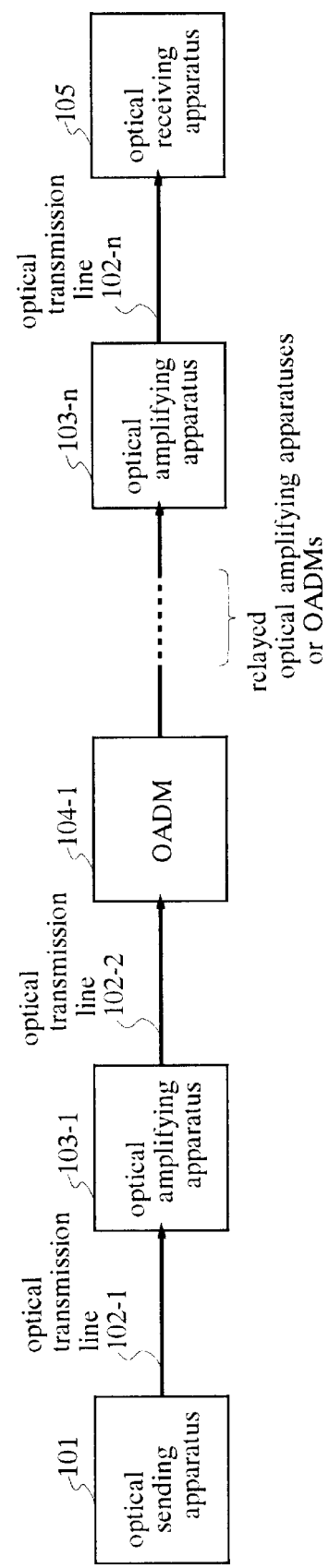
FIG. 3 is a block diagram showing the construction of an optical communication system according to the third embodiment.

In FIG. 3, an optical communication system comprises an optical sending apparatus 101 for generating WDM optical signals by the polarization crossing method, an optical transmission line 102 for transmitting the WDM optical signals outputted from the optical sending apparatus 101, and an optical receiving apparatus 105 to which the WDM optical signals so transmitted are inputted, and which receives and processes the WDM optical signals. In this optical communication system, optical amplifying apparatuses 103 for compensating the transmission loss of the optical transmission line 102 and optical add/drop multiplexer 104 (hereinafter called the "OADM") for adding and dropping channels from the WDM optical signals transmitting through the optical transmission line 102, may be connected and interested in multiple stages into the optical transmission line 102, whenever necessary.

The optical sending apparatus 101 is the optical sending apparatus according to the present invention, and its construction will be explained later.

The optical transmission line 102 comprises various optical fibers such as a 1.3 $\mu$m band zero-dispersion single mode fiber, a 1.5 $\mu$m band dispersion shift fiber, and so forth. Chromatic dispersion is remarkable particularly when the optical transmission line 102 is an existing 1.3 $\mu$m band zero-dispersion single mode fiber, and transmits 1.5 $\mu$m band WDM optical signals. The optical sending apparatus 101 according to the present invention exhibits a remarkable effect in such a case.

An optical receiving apparatus 105 comprises an optical amplifier, an optical de-multiplexer and an optical receiver, for example. The WDM optical signal inputted from the optical transmission line 102 to the optical receiving apparatus 105 is amplified to a predetermined level by the optical amplifier as a pre-amplifier and is subjected to wavelength separation for each channel by the optical de-multiplexer. Each channel so separated is inputted to, and received by, the optical receiver comprising a photo-diode, a demodulator, or the like.

The optical amplifying apparatus 103 includes an erbium-doped optical fiber amplifier comprising an erbium-doped optical fiber and a pump light source, for example. Receiving the supply of energy from the pump light source, the erbium-doped optical fiber forms a population inversion. When the WDM optical signal to be amplified is inputted under this state, the erbium-doped optical fiber induces stimulated emission and amplifies the WDM optical signal. Incidentally, the amplification band of the optical amplifying apparatus 103 is so decided as to coincide with the wavelength band of the WDM optical signal. The amplification band can be changed by changing the kind of the rare earth element doped into the optical fiber and the excitation wavelength of the pump light source. An erbium-doped optical fiber amplifier using a wavelength of 1.48 $\mu$m or a wavelength of 0.98 $\mu$m as the excitation wavelength, for example can amplify a 1.55 $\mu$m band.

The OADM 104 comprises, for example, an optical coupler for branching the WDM optical signal outputted from the optical transmission line 102 to two parts, an optical receiver for receiving a channel to be dropped by this OADM from one of the WDM optical signals so branched, an optical filter for cutting off only the channel to be dropped by this OADM from the other WDM optical signal so branched, an optical sender for generating an optical signal of a channel to be added by this OADM, and an optical multiplexer for wavelength-multiplexing the WDM optical signal transmitting through the optical filter and the optical signal outputted from the optical sender. Incidentally, the OADM is an apparatus for adding/dropping the optical signal as such when the channel is added and dropped. However, it may be a adding/dropping apparatus that converts the optical signal to an electric signal, adds and drops the channel by the electric signal, and then converts the electric signal to the optical signal when the channel is added and dropped.

Next, the optical sending apparatus 101 will be explained.

Figure 4:
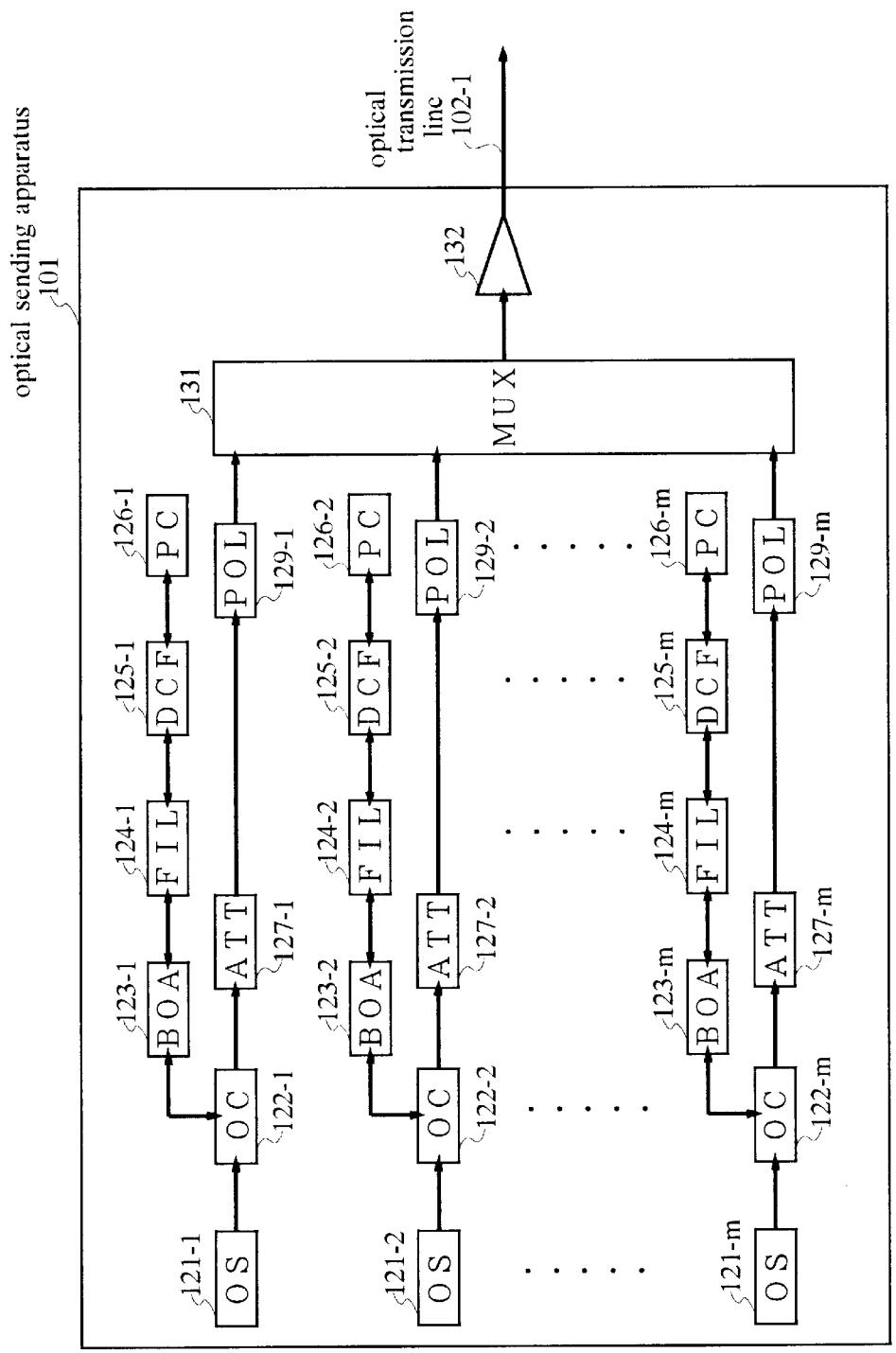
FIG. 4 is a block diagram showing the construction of an optical sending apparatus in the optical communication system according to the third embodiment.

In FIG. 4, m sets of optical senders 121-1 to 121-m (hereinafter called the "OS") inside the optical sending apparatus 101 generate optical signals having mutually different wavelengths, respectively. These mutually different wavelengths are set to the wavelengths of the channels in the WDM optical signals. The OS 121, for example, may comprise a semiconductor laser for oscillating a laser beam at a predetermined wavelength and an external interferometer such as a Mach-Zehnder optical modulator for externally modulating the laser beam by the information to be transmitted.

Since a semiconductor laser generally oscillates a laser beam under the state of predetermined linearly polarized wave, the optical signal outputted from each OS 121-1 to 121-m can have the same polarization condition.

The optical signal outputted from each OS 121-1 to 121-m is inputted to the first port of each optical circulator (hereinafter called the "OC") 122-1 to 122-m. The OC 122 includes three ports. It outputs the light inputted to its first port to the second port, outputs the light inputted to the second port to the third port, and outputs the light inputted to the third port to the first port.

Therefore, the optical signal of each OS 121-1 to 121-m inputted to the first port is outputted from the second port of each OC 122-1 to 122-m, and is inputted to each bi-directional optical amplifier (hereinafter called the "BOA") 123-1 to 123-m.

BOA 123 includes two input/output ports and can amplify the light when the light is inputted to either input/output ports. BOA can use an erbium-doped fiber amplifier pumped bi-directionally, for example.

The optical signal amplified by each BOA 123-1 to 123m is inputted to each optical filter (hereinafter called the "FIL") 124-1 to 124-m.

FIL 124 is a band-pass optical filter, and the center wavelength of its pass wavelength band is set to the wavelength of the optical signal of each channel of the WDM optical signal. When OS 121-1 generates the optical signal of the channel 1, for example, the center wavelength of FIL 124-1 connected to OS 121-1 through OC 122-1 and BOA 123-1 is set to the wavelength of the channel 1. When OS 121-2 generates the optical signal of the channel 2, the center wavelength of FIL 124-2 connected to OS 121-2 through OC 122-2 and BOA 123-2 is set to the wavelength of the channel 2.

The optical signal outputted from each FIL 124-1 to 124-m is inputted to each dispersion compensating fiber (hereinafter called "DCF") 125-1 to 125-m. The optical signal outputted from each DCF 125-1 to 125-m is inputted to each polarization converter (hereinafter called "PC") 126-1 to 126-m. This PC 126 includes a 45° Faraday rotator and a reflecting mirror that are disposed in this order on the main optical path. The 45° Faraday rotator comprises a magneto-optic crystal such as yttrium iron garnet (YIG) disposed on the main optical path and a magnet for applying a magnetic field to this magneto-optic crystal in the direction of the main optical path. The thickness of the magneto-optic crystal and the intensity of the magnetic field of the magnet are set so that the angle of rotation is 45 degrees.

After the polarization condition is rotated by 45° by the 45° Faraday rotator, the light inputted to PC 126 is inputted to the reflecting mirror. The light rotated by 45° is reflected by the reflecting mirror, and is again inputted to the 45° Faraday rotator with the result that its polarization condition is further rotated by 45°. Inconsequence, the light inputted to PC 126 is outputted from PC 126 while its polarization condition is rotated by 90°. Light having the x polarization component, for example, is converted by PC 126 so that it becomes light that has the y polarization component, which crosses orthogonal to the light with the x polarization component.

The optical signal outputted from each PC 126-1 to 126-m is again inputted to the second port of each OC 122-1 to 122-m through each DCF 125-1 to 125-m, each FIL 124-1 to 124-m and each BOA 123-1 to 123-m.

The output signal inputted to each second port is outputted from the third port of each OC 122-1 to 122-m, and is inputted to each optical attenuator (hereinafter called "ATT") 127-1 to 127-m.

ATT 127 attenuates the level of the input light to a predetermined level and then outputs the optical signal. The optical signal outputted from each ATT 127-1 to 127-m is inputted to each polarizer (hereinafter called "POL") 129-1 to 129-m. The optical signal outputted from each POL 129-1 to 129-m is inputted to MUX 131.

Here, the optical transmission line that connects these optical components, i.e. OS 121, OC 122, ATT 127, POL 129 and MUX 131, is the one that maintains the polarization condition constant. The optical transmission line may use a polarization condition maintaining fiber (hereinafter called "PMF") such as a PANDA fiber, a bowtie fiber, an elliptic jacket fiber, and the like. PMF utilizes double refraction and maintains the plane of polarization. To obtain this double refraction, two methods are available. The first changes a fiber material between the transverse direction and the longitudinal direction in the fiber section crossing orthogonal to the longitudinal direction of PMF so as to change a refractive index distribution. The second method applies different stresses to the core between the transverse direction and the longitudinal direction to as to provide equivalently double refraction.

The PANDA fiber forms stress-imparted portions of silica glass doped with boronia ($B_2O_3$) on both sides of the core portion and provides equivalently double refraction.

Figure 5:
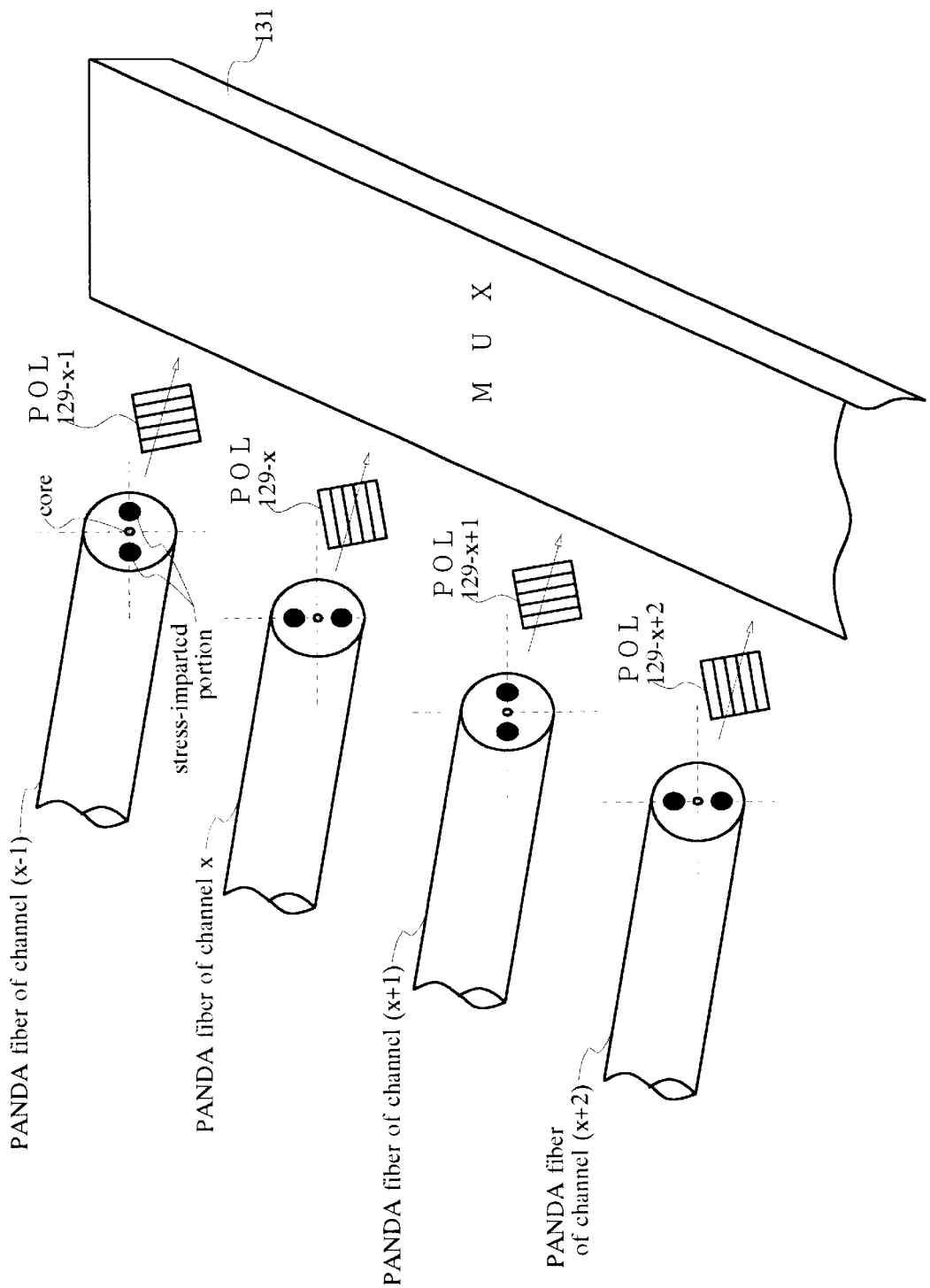
FIG. 5 is an explanatory view showing a connection method of an optical attenuator and an optical multiplexer.

When the optical signal outputted from each ATT 127-1 to 127-m is inputted to MUX 131 through each POL 129-1 to 129-m, the optical signals in the polarization condition, with the adjacent channels, must be made to cross orthogonal to each other. Therefore, one of PMF that connects each ATT 127-1 to 127-m to MUX 131 through POL 129-1 to 129-m is twisted to about 90° relative to the other PMF between PMF for transmitting the optical signals of the adjacent channels, and is connected to MUX 131 through POL 129. When the PANDA fiber is used for PMF, for example, as shown in FIG. 5, the plane inclusive of the centers of the two stress-imparted portions of one of the PANDA fibers is twisted to an angle of about 90° relative to the plane inclusive of the centers of the two stress-imparted portions of the other PANDA fiber among the PANDA fibers for transmitting the optical signals of the adjacent channels. The PANDA fiber is then connected to MUX 131 through POL 129.

MUX 131 wavelength-multiplexes the optical signal inputted thereto from each ATT 127-1 to 127-m through POL 129-1 to 129-m, and generates the WDM optical signal. In this case, each PMF is connected to MUX 131 as described above, and the polarization condition of the optical signal generated by each OS 121-1 to 121-m is substantially the same. Therefore, the WDM optical signal that is wavelength-multiplexed in MUX 131 becomes the WDM optical signal generated by the polarization crossing method, with adjacent channels in the polarization conditions crossing orthogonal to each other. MUX 131 may use a dielectric multilayer optical filter as one of the interference filters or an arrayed waveguide grating type optical multi/demultiplexer.

The WDM optical signal outputted from MUX 131 is inputted to an optical amplifier 132 as a post-amplifier. The optical amplifier 132 can use a rare earth element-doped optical fiber amplifier or a semiconductor optical amplifier.

The WDM optical signal outputted from the optical amplifier 132 is sent as the output of the optical sending apparatus 101 to the optical transmission line 102-1.

Function and Effect of the Third Embodiment

In the optical sending apparatus 101 of the third embodiment, the function and effect, till each optical signal generated by each OS 121 is inputted to MUX 131, is in common for each optical signal. Therefore, the explanation will be given on the function and effect of the optical signal of the channel 1 generated by OS 121-1, for example, and the explanation on other optical signals will be omitted.

The optical signal generated by OS 121-1 is inputted to, and amplified by, BOA 123-1 through OC 122-1. In consequence, BOA 123-1 compensates for the loss occurring in the optical signal by OC 122-1.

The optical signal after this loss compensation is inputted to FIL 124-1, and the light other than that of the channel 1 can be cut off. For example, pump light of BOA 123 can be eliminated.

The optical signal outputted from FIL 124-1 is inputted to PC 126-1 through DCF 125-1. The optical signal inputted to PC 126-1 is outputted from PC 126-1 under the state where its polarization is rotated by 90° by the 45° Faraday rotator and the reflecting mirror of PC 126-1 as described above. The optical signal outputted from PC 126-1 is again inputted to FIL 124-1 through DCF 125-1. Consequently, the optical signal outputted from FIL 124-1 propagates through DCF 125-1 under the state where its polarization is rotated by 90° in the going and returning routes of DCF 125-1. For this reason, DCF 125-1 can compensate the chromatic dispersion without polarization fluctuation.

The optical signal outputted from FIL 124-1 in this way goes and returns through DCF 125-1. Therefore, DCF 125-1 can acquire the predetermined dispersion compensation value to be compensated with its length substantially the half of the length when compensation is made by causing the light to propagate through the ordinary dispersion compensating fiber in only one direction.

When the chromatic dispersion occurring in the optical transmission line 102-1 is fully compensated by the optical sending apparatus 101, the predetermined dispersion compensation value is the value having an opposite sign to the chromatic dispersion value occurring in the optical transmission line 102-1. When the chromatic dispersion occurring in the optical transmission line 102-1 is divided in a suitable ratio and compensation is made by the optical sending apparatus 101, and the optical amplifying apparatus 103-1, the predetermined dispersion compensation value is a value having the opposite sign to the chromatic dispersion value allotted to the optical sending apparatus 101 among the chromatic dispersion values occurring in the optical transmission line 102-1. Incidentally, in the case of the optical communication system not including the optical amplifying apparatus 103-1, etc, the optical receiving apparatus 105 may compensate the component allotted to the optical amplifying apparatus 103-1.

The optical signal that goes and returns through DCF 125-1 is inputted again to BOA 123-1 through FIL 124-1, and is again amplified. Therefore, the optical sending apparatus 101 can compensate the loss occurring in this optical signal by FIL 124-1, DCF 125-1 and PC 126-1.

The amplified optical signal is inputted to ATT 127-1 through OC 122-1.

The optical signal of OS 121-1 is inputted to the first port of OC 122-1 and is outputted from the third port of OC 122-1 while the chromatic dispersion is compensated without polarization fluctuation and while its polarization condition is rotated by 90° in the way described above.

The optical signal inputted to ATT 127-1 is attenuated by a predetermined attenuation quantity. This predetermined attenuation quantity is the one that corresponds to pre-emphasis of the optical signal of the channel 1. Setting of the predetermined attenuation quantity may be regulated and fixed when the optical sending apparatus 101 is installed to the optical communication system. Alternatively, setting of the predetermined attenuation quantity may be made as a measuring instrument for measuring the level of the optical signal of each channel is provided to the optical receiving apparatus 105, and the measurement result is transmitted to the optical sending apparatus 101. In this case, ATT 127 must be a variable optical attenuator.

POL 129-1 takes out and outputs the linearly polarized wave having a specific plane of polarization from among the inputted light. When optical components for maintaining polarization are connected in multiple stages, the polarization extinction ratio deteriorates and transmission characteristics may deteriorate. POL 129-1 improves this polarization extinction ratio and can avoid the deterioration of the transmission characteristics.

The optical signals generated by other OS 121-2 to 121-m are similarly processed and are inputted to MUX 131. At this time, PMF for connecting each ATT 127 to MUX 131 is connected as described above. Therefore, the WDM optical signal outputted from MUX 131 is the WDM optical signal by the polarization crossing method.

This WDM optical signal is amplified by the optical amplifier 132 so as to compensate for the transmission loss of the optical transmission line 102-1, and is outputted to the optical transmission line 102-1.

Here, when the channel is extended on the shorter wavelength side than the channel 1, optical components having similar construction to those of OS 121, OC 122, BOA 123, FIL 124, DCF 125, PC 126 and ATT 127 are first prepared. Next, PMF from ATT 127 is connected to MUX 131 in such a manner as to cross orthogonal to the channel 1 in the polarization condition. When the channel is installed on the longer wavelength side than the channel m, optical components having similar constructions to those of OS 121, OC 122, BOA 123, FIL. 124, DCF 125, PC 126 and ATT 127 are prepared, and PMF from ATT 127 is connected to MUX 131 in such a manner as to cross orthogonal to the channel m in the polarization condition. Incidentally, setting of OS 121, FIL 124, DCF 125 and ATT 127 in the optical components extended is brought into conformity with the channel to be extended, and the wavelength of OS 121 is set with a space of at least 0.4 nm from the wavelength of the channel 1 or the channel m.

The WDM optical signal generated by the optical sending apparatus 101 in the optical communication system is outputted to the optical transmission line 102-1, and the optical amplifying apparatus 103 compensates the transmission loss of the optical transmission line. OADM 104 adds and drops the channel, whenever necessary. The WDM optical signal is inputted to the optical receiving apparatus 105 and is subjected to reception processing.

Next, still another embodiment of the present invention will be explained.

Fourth Embodiment

The optical communication system according to the fourth embodiment uses an optical sending apparatus 106 in place of the optical sending apparatus 101 in the optical communication system according to the third embodiment. In other words, the optical communication system in the fourth embodiment comprises an optical sending apparatus 106 for generating the WDM optical system by the polarization crossing method, an optical transmission line 102 for transmitting the WDM optical signal outputted from the optical sending apparatus 106, and an optical receiving apparatus 105 for receiving the input of the WDM optical signal so transmitted, and processing this WDM optical system. In this optical communication system, optical amplifying apparatuses 103 and OADM 104 are relay-connected in multiple stages between the optical transmission lines 102, whenever necessary.

Next, the construction of the optical sending apparatus 106 will be explained.

Figure 6:
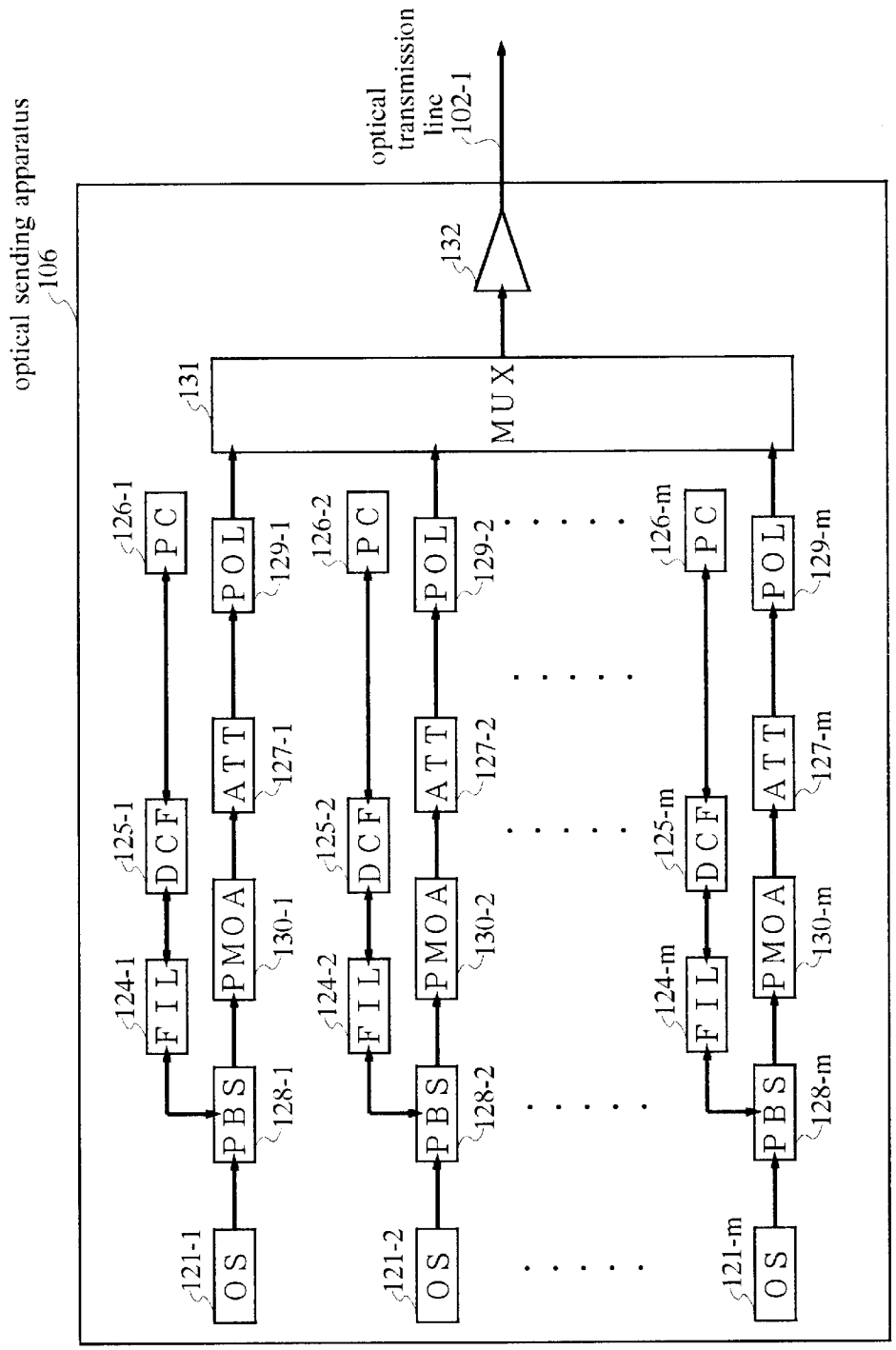
FIG. 6 is a block diagram showing the construction of an optical sending apparatus in the optical communication system according to the fourth embodiment.

In FIG. 6, the optical signal generated by each of m OS 121-1 to 121-m inside the optical sending apparatus 106 is inputted to each polarization beam splitter (hereinafter called "PBS" ) 128-1 to 128-m.

PBS 128 includes three ports and separates the light inputted to the first port into p polarization and s polarization. PBS 128 outputs the p polarization so separated from the second port, and outputs also the s polarization so separated to the third port. Since the optical components can function even when the input and the output are exchanged, PBS 128 outputs the p polarization from the first port when the p polarization is inputted to the second port, and outputs the s polarization from the first port when the s polarization is inputted to the third port.

Therefore, when the optical signal outputted from each OS 121-1 to 121-m is the p polarization, each OS 121-1 to 121-m and the second port of each PBS 128-1 to 128-m are connected to each other. When the optical signal outputted from each OS 121-1 to 121-m is the s polarization, on the other hand, each OS 121-1 to 121-m and the third port of each PBS 128-1 to 128-m are connected to each other.

Hereinafter, the explanation will be given on the case where the optical signal outputted from each OS 121-1 to 121-m is the p polarization, for the sake of explanation.

The optical signal of each OS 121-1 to 121-m inputted to the second port is outputted from the first port of each PBS 128-1 to 128-m, and is inputted to each PC 126-1 to 126-m through each FIL 124-1 to 124-m and through each DCF 125-1 to 125-m. The optical signal inputted to PC 126 is outputted from PC 126 after its polarization condition is rotated by 90°.

The optical signal outputted from each PC 126-1 to 126-m is again inputted to the first port of each PBS 128-1 to 128-m through each DCF 125-1 to 125-m and through each FIL 124-1 to 124-m. Since the p polarization is converted to the s polarization in each PC 126-1 to 126-m, each optical signal thus inputted to the first port is outputted from the third port of each PBS 128-1 to 128-m.

Each optical signal outputted from the third port is inputted to each polarization-maintaining optical amplifier (hereinafter called "PMOA") 130-1 to 130-m.

PMOA 130 amplifies the inputted light while maintaining the polarization condition. In a rare earth-doped optical fiber amplifier, PMOA 130 can be produced as all the optical fibers comprise PMF.

After being amplified by each PMOAS 130-1 to 130-m while its polarization condition is maintained, the optical signal is inputted to MUX 131 through each ATT 127-1 to 127-m and through each POL 129-1 to 129-m.

Here, the optical transmission line for connecting the optical components such as OS 121, PBS 128, FIL 125, DCF 124, PC 126, PMOA 130, ATT 127, POL 129 and MUX 131 is PMF in the same way as in the third embodiment. When the output signal outputted from each ATT 127-1 to 127-m is inputted to MUX 131, the optical signals of the adjacent channels in the polarization conditions must be made to cross orthogonal to each other. Therefore, one of PMF for connecting each ATT 127-1 to 127-m to MUX 131 through each POL 129-1 to 129-m is twisted by about 90° relative to the other PMF between both PMF for transmitting the optical signals of the adjacent channels, in the same way as in the third embodiment.

MUX 131 wavelength-multiplexes the optical signals inputted to MUX 131 from each ATT 127-1 to 127-m through each POL 129-1 to 129-m, and generates a WDM optical signal generated by the polarization crossing method. The resulting WDM optical signal is sent to the optical transmission line 102-1 through the optical amplifier 132.

Function and Effect of the Fourth Embodiment

As can be appreciated from the explanation given above, the optical sending apparatus 106 according to the fourth embodiment uses PBS 128 in place of OC 122 (FIG. 4) in the third embodiment and PMOA 130 in place of BOA 123 (FIG. 4). In this point, the fourth embodiment is different from the third embodiment.

Here, both OC 122 and PBS 128 function in the same way because they output the light inputted to the first port to the second port and output the light inputted to the second port to the third port. Both BOA 123 and PMOA function in the same way in that they compensate for the loss of OC 122, or PBS 128, FIL 124, DCF 125 and PC 126.

Therefore, the optical sending apparatus 106 according to the fourth embodiment can output the WDM optical signal by the polarization crossing method, which is free from the polarization fluctuation and the chromatic dispersion of which is compensated, to the optical transmission line 102, in the same way as the optical sending apparatus 101 of the third embodiment.

In the third and fourth embodiments, FIL 125 may be connected between DCF 124 and PC 126.

Next, still another embodiment of the present invention will be explained.

Fifth Embodiment

The optical communication system according to the fifth embodiment uses an optical sending apparatus 108 in place of the optical sending apparatus 101 in the optical communication system according to the third embodiment. In other words, the optical communication system in the fifth embodiment comprises an optical sending apparatus-108 for generating the 15-wave WDM optical system by the polarization crossing method, an optical transmission line 102 for transmitting the WDM optical signal outputted from the optical sending apparatus 108, and an optical receiving apparatus 105 for receiving the input of the WDM optical signal so transmitted, and processing this WDM optical system. In this optical communication system, optical amplifying apparatuses 103 and OADM 104 are relay-connected in multiple stages between the optical transmission lines 102, whenever necessary.

Next, the construction of the optical sending apparatus 108 will be explained.

Figure 7:
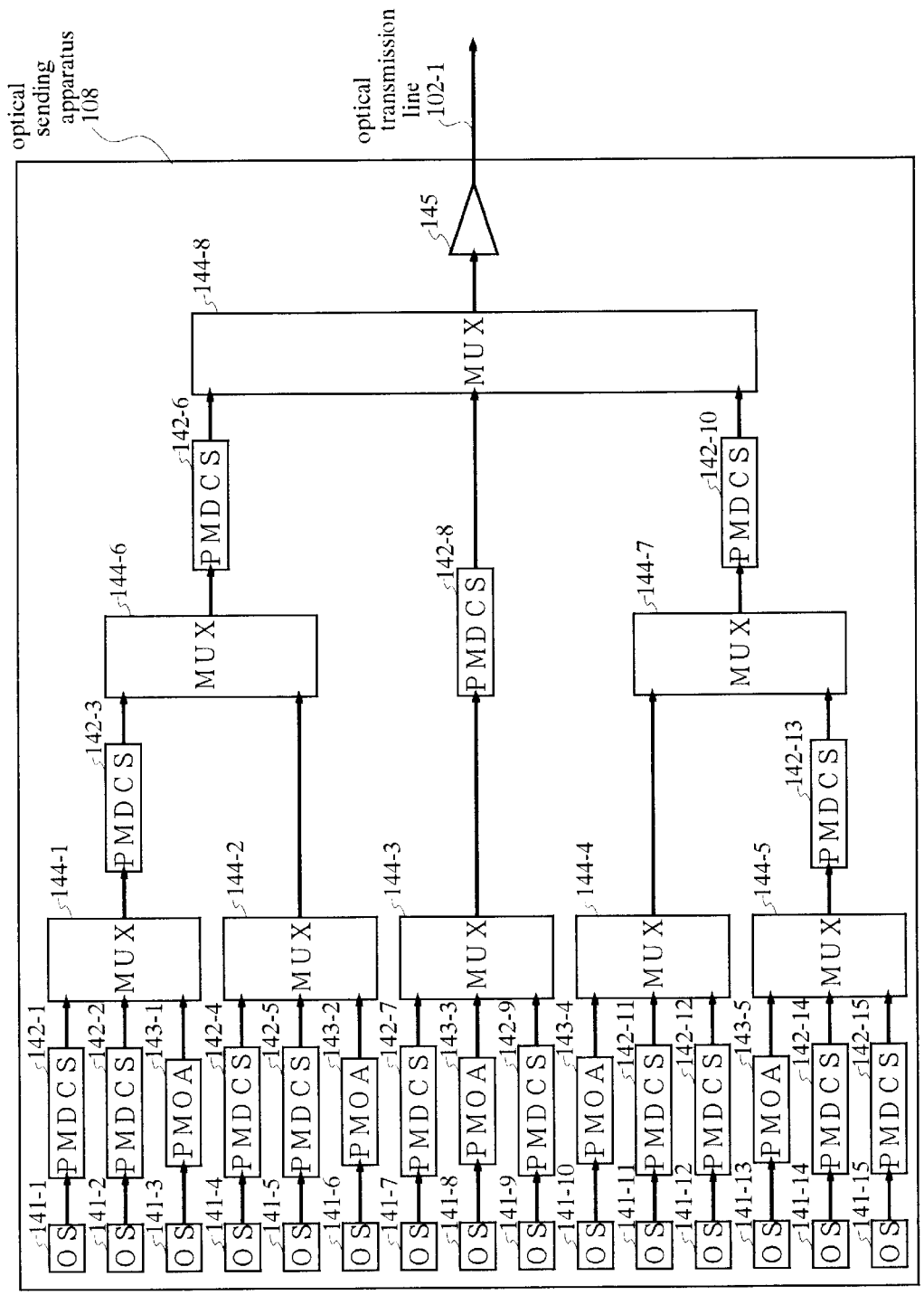
FIG. 7 is a block diagram showing the construction of an optical sending apparatus in an optical communication system according to the fifth embodiment.

Referring to FIG. 7, fifteen sets of OS 141-1 to 141-15 generate fifteen optical signals corresponding to the channels of the WDM optical signals. OS 141 may comprise a semiconductor laser for oscillating a laser beam at a predetermined wavelength and an external modulator such as a Mach-Zehnder type optical modulator for modulating the laser beam by information to be transmitted.

The optical signal of each channel generated by each OS 121-1 to 121-15 is assorted into a group in accordance with the dispersion compensation value for compensating for the chromatic dispersion. In other words, the optical signals are assorted into a first group of channels 1 to 3 generated by OS 141-1 to 141-3, a second group of channels 4 to 6 generated by OS 141-4 to 141-6, a third group of channels 7 to 9 generated by OS 141-7 to 141-9, a fourth group of channels 10 to 12 generated by OS 141-10 to 141-12 and a fifth group of channels 13 to 15 generated by OS 141-13 to 141-15.

In the first group, the optical signal outputted from OS 141-1 is inputted to a polarization-maintaining dispersion compensating section (hereinafter called "PMDSC") 142-1 that compensates the chromatic dispersion by a predetermined dispersion compensation value without polarization fluctuation, and outputs the signal while its polarization condition is rotated by 90°. The predetermined dispersion compensation value is the balance obtained by subtracting the dispersion compensation values of PMDCS 142-3 and 142-6 from the dispersion compensation value to be compensated by the optical sending apparatus 108 among the dispersion compensation values for compensating the chromatic dispersion occurring in the channel 1, in the optical transmission line 102-1.

The optical fiber for connecting OS 141-1and PMDCS 142-1 uses PMF. Similarly, the optical fiber for connecting later-appearing optical components uses PMF. The output signal outputted from OS 141-2 is inputted to PMDCS 142-2. The chromatic dispersion value of PMDCS 142-2 is the balance obtained by subtracting the dispersion compensation values of PMDCS 142-3 and 142-6 from the dispersion compensation value to be compensated by the optical sending apparatus 108 among the dispersion compensation values for compensating for the chromatic dispersion occurring in the channel 2, in the optical transmission line 102-1. The reason why the dispersion compensation values of PMDCS 142-1 and 142-2 are set in this way is because the dispersion compensation value for compensating the chromatic dispersion occurring in the optical signals of the channels 3 and 6, that are generated by OS 141-3 and 141-6, are used as the reference. The optical signal outputted from OS 141-3 is inputted to PMOA 143-1, and is amplified while its polarization condition is maintained.

The optical signal of the channel 1 after dispersion compensation by PMDCS 142-1, the optical signal of the channel 2 after dispersion compensation by PMDCS 142-2 and the optical signal of the channel 3 amplified by PMOA 143-1 are inputted to, and multiplexed by, MUX 144-1. In this instance, the optical signals in the polarization conditions, of the adjacent channels, must cross orthogonal to each other. Therefore, one of PMF connected to MUX 144-1 is twisted to about 90° relative to the other and is connected to MUX 144-1, in the same way as in the third embodiment.

In the second group, the optical signals of the channels 4 and 5 generated by OS 141-4 and 141-5 are inputted to PMDCS 142-4 and 142-5, respectively, and their chromatic dispersion is compensated. The dispersion compensation value of PMDCS 142-4 uses, as the reference, the dispersion compensation value for compensating the chromatic dispersion occurring in the optical signal of the channel 6 that is generated by OS 141-6. Therefore, it is the balance obtained by subtracting the dispersion compensation value of PMDCS 142-6 from the dispersion compensation value to be compensated by the optical sending apparatus 108 among the dispersion compensation values for compensating the chromatic dispersion occurring in the optical signal of the channel 4, in the optical transmission line 102-1. Similarly, the dispersion compensation value of PMDCS 142-5 is the balance obtained by subtracting the dispersion compensation value of PMDCS 142-6 from the dispersion compensation value to be compensated by the optical sending apparatus 108 among the dispersion compensation values for compensating the chromatic dispersion occurring in the optical signal of the channel 5 in the optical transmission line 102-1. The optical signal from OS 141-6 is inputted to PMOA 143-2 and is amplified while its polarization condition is maintained.

The optical signal of the channel 4 after dispersion compensation by PMDCS 142-4, the optical signal of the channel 5 after dispersion compensation by PMDCS 142-5 and the optical signal of the channel 6 after amplification by PMOA 143-6 are inputted to, and multiplexed by MUX 144-2. In this instance, PMF for connecting PMDCS 142-4, 142-5 and PMOA 143-2 to MUX 144-2 is twisted and connected to MUX 144-2 so that channel 3 in the polarization condition crosses orthogonal to channel 4 in the polarization condition, and the adjacent channels in the polarization conditions cross orthogonal to each other inside the second group, too.

Inside the third group, the optical signals of the channels 7 and 9 generated by OS 141-7 and 141-9 are inputted to PMDCS 142-7 and 142-9, respectively, and chromatic dispersion is compensated. The dispersion compensation value of each PMDCS 142-7, 142-9 is decided in the same way as in the second group with the dispersion compensation value for compensating the chromatic dispersion occurring in the optical signal of the channel 8 generated in OS 141-8, as the reference. The optical signal outputted from OS 141-8 is inputted to PMOA 143-3 and is amplified while its polarization is maintained.

The optical signal of the channel 7 after dispersion compensation by PMDCS 142-7, the optical signal of the channel 9 after dispersion compensation by PMDCS 142-9 and the optical signal of the channel 8 amplified by PMOA 143-3 are inputted to, and multiplexed by, MUX 144-3. In this instance, PMF for connecting PMDCS 142-7, 142-9 and PMOA 143-3 to MUX 144-3 is twisted and connected to MUX 144-3 so that channel 6 in the polarization condition crosses orthogonal to channel 7 in the polarization condition, and the adjacent channels in the polarization conditions cross orthogonal to each other inside the third group, too.

Inside the fourth group, the optical signals of the channels 11 and 12 generated by OS 141-11 and 141-12 are inputted to PMDCS 142-11 and 142-12, respectively, and chromatic dispersion is compensated. The dispersion compensation value of each PMDCS 142-11, 142-12 is decided in the same way as in the second group with the dispersion compensation value for compensating the chromatic dispersion occurring in the optical signal of the channel 10 generated in OS 141-10, as the reference. The optical signal outputted from OS 141-10 is inputted to PMOA 143-4 and is amplified while its polarization is maintained.

The optical signal of the channel 11 after dispersion compensation by PMDCS 142-11, the optical signal of the channel 12 after dispersion compensation by PMDCS 142-12 and the optical signal of the channel 10 amplified by PMOA 143-4 are inputted to, and multiplexed by, MUX 144-4. In this instance, PMF for connecting PMDCS 142-11, 142-12 and PMOA 143-4 to MUX 144-4 is twisted and connected to MUX 144-4 so that channel 9 in the polarization condition of crosses orthogonal to that of the channel 10, and the adjacent channels in the polarization conditions cross orthogonal to each other inside the fourth group, too.

Inside the fifth group, the optical signals of the channels 14 and 15 generated by OS 141-14 and 141-15 are inputted to PMDCS 142-14 and 142-15, respectively, and chromatic dispersion is compensated. The dispersion compensation value of each PMDCS 142-14, 142-15 is decided in the same way as in the first group with the dispersion compensation value for compensating the chromatic dispersion occurring in the optical signal of the channel 10 and 13 generated in OS 141-10 and 141-13 respectively, as the reference. The optical signal outputted from OS 141-13 is inputted to PMOA 143-5 and is amplified while its polarization is maintained.

The optical signal of the channel 14 after dispersion compensation by PMDCS 142-14, the optical signal of the channel 15 after dispersion compensation by PMDCS 142-15 and the optical signal of the channel 13 amplified by PMOA 143-5 are inputted to, and multiplexed by, MUX 144-5. In this instance, PMF for connecting PMDCS 142-14, 142-15 and PMOA 143-5 to MUX 144-5 is twisted and connected to MUX 144-5 so that channel 12 in the polarization condition crosses orthogonal to channel 13 in the polarization condition, and the adjacent channels in the polarization conditions cross orthogonal to each other inside the fifth group, too.

Five WDM optical signals outputted from MUX 144-1 to 144-5 are further divided into the group of the WDM optical signals of MUX 144-1 and 144-2, the WDM optical signal of MUX 144-3 and the WDM optical signals of MUX 144-4 and 144-5.

The WDM optical signal from MUX 144-1 is inputted to MUX 144-6 through PMCDS 142-3, and the WDM optical signal from MUX 144-2 is inputted as such to MUX 144-6. MUX 144-6 further multiplexes these WDM optical signals. In this instance, since the channels 3 and 4 in the polarization conditions cross orthogonal to each other, PMF for connecting PMDCS 142-3 and MUX 144-6 and PMF for connecting MUX 144-2 and MUX 144-6 are connected to MUX 144-6 in such a manner as to maintain this polarization condition. When the PANDA fibers are used, for example, MUX 144-6 is connected in such a fashion that the angle between two planes inclusive of two centers of the stress-imparted portions becomes substantially zero (0) in these PANDA fibers.

The dispersion compensation value of PMDCS 142-3 uses, as the reference, the dispersion compensation value for compensating the chromatic dispersion occurring in the optical signal of the channel 6 generated by OS 141-6. Therefore, this dispersion compensation value is the balance obtained by subtracting the dispersion compensation value of PMDCS 142-6 from the dispersion compensation value to be compensated by the optical sending apparatus 108 among the dispersion compensation values for compensating the chromatic dispersion occurring in the optical signal of the channel 3 in the optical transmission line 102-1.

The WDM optical signal outputted from MUX 144-6 is inputted to MUX 144-8 through PMDCS 142-6. The dispersion compensation value of PMDCS 142-6 is the dispersion compensation value to be compensated by the optical sending apparatus 108 among the dispersion compensation values for compensating the chromatic dispersion that occurs in the optical signal of the channel 6 in the optical transmission line 102-1.

The WDM optical signal of MUX 144-3 is inputted to MUX 144-8 through PMDCS 142-8. The dispersion compensation value of PMDCS 142-8 is the dispersion compensation value to be compensated by the optical sending apparatus 108 among the dispersion compensation values for compensating the chromatic dispersion that occurs in the optical signal of the channel 8 in the optical transmission line 102-1.

The WDM optical signal from MUX 144-4 is inputted as such to MUX 144-7, and the WDM optical signal from MUX 144-5 is inputted to MUX 144-7 through PMCDS 142-13. MUX 144-7 further multiplexes these WDM optical signals. In this instance, since channels 12 and 13 in the polarization conditions cross orthogonal to each other, PMF for connecting PMDCS 142-13 and MUX 144-7 and PMF for connecting MUX 144-4 and MUX 144-7 are connected to MUX 144-7 in such a manner as to maintain this polarization condition.

The dispersion compensation value of PMDCS 142-13 uses, as the reference, the dispersion compensation value for compensating the chromatic dispersion occurring in the optical signal of the channel 10 generated by OS 141-10. Therefore, this dispersion compensation value is the balance obtained by subtracting the dispersion compensation value of PMDCS 142-10 from the dispersion compensation value to be compensated by the optical sending apparatus 108 among the dispersion compensation values for compensating the chromatic dispersion occurring in the optical signal of the channel 13 in the optical transmission line 102-1.

The WDM optical signal outputted from each PMDCS 142-6, 142-8, 142-10 is inputted to, and multiplexed by, MUX 144-8. In this instance, since the channels 6 and 7 in the polarization conditions cross orthogonal to each other and since the channels 9 and 10 in the polarization conditions cross orthogonal to each other, each PMF for connecting PMDCS 142-6, 142-8, 142-10 to MUX 144-8 is connected to MUX 144-8 in such a manner as to maintain this state. In this way, the WDM optical signals of the fifteen waves by the polarization crossing method are generated. After being amplified by the optical amplifier 146 as a pre-amplifier, these WDM optical signals are sent to the optical transmission line 102-1.

Next, the construction of PMDCS 142 will be explained.

FIG. 8 shows the construction of the polarization-maintaining dispersion compensating section in an optical sending apparatus 108 of the fifth embodiment. FIG. 8(a) shows the construction of the first polarization-maintaining dispersion compensating section, and FIG. 8(b) shows the construction of the second polarization-maintaining dispersion compensating section. Both of these constructions of the polarization-maintaining dispersion compensating section can be used for the fifth embodiment.

In FIG. 8(a), the optical signal inputted to PMDCS 142a is inputted to the first port of OC 122 and is outputted from the second port. The optical signal so outputted is inputted to PC 126 through BOA 123, FIL 124 and DCF 125. After the polarization condition of the optical signal so inputted is rotated by 90° by PC 126, the optical signal is outputted from PC 126 and is again inputted to the second port of OC 122 through DCF 125, FIL 124 and BOA 123. The optical signal inputted to the second port of OC 122 is outputted from the third port of OC 122. Therefore, the chromatic dispersion of the optical signal inputted to the first port of OC 122 is compensated without polarization fluctuation, and this signal is outputted from the third port of OC 122 under the polarization condition where its polarization condition is rotated by 90°. The optical signal outputted from the third port of OC 122 is inputted to ATT 127, is attenuated by a predetermined attenuation quantity, and is outputted from PMDCS 142a.

In FIG. 8(b), the optical signal inputted to PMDCS 142b is inputted to the first port of PBS 128 and is outputted from the second port. The optical signal so outputted is inputted to PC 126 through FIL 124 and DCF 125. After the polarization condition of this signal is rotated by 90° by PC 126, the signal is outputted from PC126 and is again inputted to the second port of PBS 122 through DCF 125 and FIL 124. The optical signal inputted to the second port of PBS 128 is outputted from the third port of PBS 128. Therefore, the chromatic dispersion of the optical signal inputted to the first port of PBS 128 is compensated without the polarization fluctuation. This signal is outputted from the third port of PBS 128 under the polarization condition where its polarization is rotated by 90°. The optical signal outputted from the third port of PBS 128 is amplified by PMOA 130 and is then inputted to ATT 127. The optical signal so inputted is attenuated by ATT 127 by a predetermined attenuation quantity and is outputted from PMDCS 142b.

Incidentally, the attenuation quantity of ATT 127 is decided in consideration of the fact that PMDCS 142 is connected in multiple stages. When pre-emphasis is made by ATT 127,the attenuation quantity of the optical signal of the channel 1 is distributed to these ATT 127 as the optical signal of the channel 1 is attenuated by each ATT 127 inside PMDCS 142-1, 142-3 and 142-6.

Function and Effect of the Fifth Embodiment

In the optical sending apparatus 108 having the construction described above, the chromatic dispersion of the optical signal is compensated by the difference from the dispersion compensation value of a certain Optical signal inside the group as the reference and over multiple stages. Therefore, the dispersion compensation value of individual PMDCS 142, that is, the dispersion compensation value of DCF 125, can be made small. Therefore, the optical sending apparatus 108 can suppress elongation of DCF 125. Since compensation is made over multiple stages, the loss occurring in DCF 125, or the like, can be amplified and compensated by BOA 123 (PMOA 130) in each stage. Therefore, the optical sending apparatus 108 can improve degradation of the optical signal-to-noise ratio.

PMDCS 142-1, PMDCS 142-3 and PMDCS 142-6 compensate for the optical signal generated in OS 141-1, for example. Therefore, the dispersion compensation value of each PMDCS 142 can be made smaller than when the chromatic dispersion of this optical signal is compensated by one PMDCS. Whenever this optical signal propagates through PMDCS 142-1, 142-3 and 142-6, it is amplified by BOA 123 (PMOA 130) inside such a PMDCS.

As explained with reference to FIG. 8, PMDCS 142 can output the inputted optical signal, the chromatic dispersion of which is compensated without polarization fluctuation and the polarization condition of which is rotated by 90°, under the polarization condition. Therefore, the optical sending apparatus 108 of the fifth embodiment can output to the optical transmission line 102 the WDM optical signals the chromatic dispersion of which is compensated without polarization fluctuation, by the polarization crossing method in the same way as the optical sending apparatus 101 of the third embodiment and the optical sending apparatus 106 of the fourth embodiment.

Incidentally, when the zero-dispersion wave-Length of the optical transmission line 102 is substantially coincident with the wavelength of the channel 8 in the fifth embodiment, the dispersion compensation of the optical signal of the channel 8 need not be made. Therefore, DCF 125 inside PMDCS 142-8 can be changed to a dummy fiber to which chromatic dispersion is not performed. Both PMDCS 142-7 and 142-9 and PMOA 143-3 can be connected directly to MUX 144-8 while MUX 144-3 and PMDCS 142-8 are omitted.

In the first group, the dispersion compensation values of PMDCS 142-1 and that of PMDCS 142-2 are decided on the basis of the dispersion compensation value of the channel 3 having the longest wavelength as the reference. However, this is in no way restrictive. The dispersion compensation value for the channel 1 having the shortest wavelength may be used as the reference, or the dispersion compensation value for the channel 2 having the center wavelength may be used as the reference. This also holds true of the other groups.

The invention is not limited to the above embodiments and various modifications may be made without departing from the spirit and scope of the invention. Any improvement may be made in part or all of the components.

What is claimed is:

1. An optical sending apparatus comprising:
    a plurality of optical signal generating means for outputting polarized light having mutually different wavelengths;
    dispersion compensating means connected to at least one of said plurality of optical signal generating means, for performing compensation with a predetermined chromatic dispersion value to polarized light outputted from said optical signal generating means while maintaining the state of said polarized light, and outputting said dispersed polarized light; and
    multiplexing means for receiving said polarized light outputted from said dispersion compensating means and said polarized light outputted from said optical signal generating means without any of the polarized light having been multiplexed with other of the polarized light, and for multiplexing said received polarized light outputted from said dispersion compensating means with said received polarized light outputted from said optical signal generating means, or multiplexing mutually said received polarized light outputted from said optical signal generating means, said polarized light input to and output from the multiplexing means having adjacent wavelengths crossing orthogonal to each other, wherein said dispersion compensating means includes an optical device having first to third ports, wherein a first port is connected to said optical signal generating means, a second port outputs light inputted to said first port, and a third port outputs light inputted to said second port, a dispersion compensating device connected to said second port of said optical device, and having a predetermined dispersion value, and polarization converting means for receiving an input of said polarized light outputted from said dispersion compensating device, rotating said polarized light outputted from said dispersion compensating device, and inputting the polarized light again to said dispersion compensating device.

2. An optical sending apparatus according to claim 1, wherein said polarization converting means rotates the output of said dispersion compensating device by approximately 90 degrees and inputs it again to said dispersion compensating device.

3. An optical sending apparatus according to claim 1, wherein an optical amplifier is interposed between said optical device and said polarization converting means.

4. An optical sending apparatus according to claim 1, wherein a band-pass filter is interposed between said optical device and said polarization converting means.

5. An optical sending apparatus according to claim 1, wherein an optical attenuator is interposed between said optical device and said polarization converting means.

6. An optical sending apparatus according to claim 1, wherein an optical amplifier capable of maintaining polarization is interposed between said optical device and said multiplexing means.

7. An optical sending apparatus according to claim 1, wherein an optical attenuator capable of maintaining polarization is interposed between said optical device and said multiplexing means.

8. An optical sending apparatus according to claim 1, wherein a polarizer capable of maintaining polarization is interposed between said optical device and said multiplexing means.

9. An optical sending apparatus according to claim 1, wherein a plurality of said optical signal generating means are all connected to said optical device, and said multiplexing means multiplexes the output from said third port of said optical device.

10. An optical sending apparatus according to claim 1, wherein said optical device is a polarization beam splitter.

11. An optical sending apparatus according to claim 1, wherein said optical device is an optical circulator.

12. An optical sending apparatus according to claim 1, which further includes a dispersion compensation unit comprising:

at least one second multiplexing means disposed at least one of the positions between said optical signal generating means and said optical device, and between said multiplexing means and a plurality of said optical signal generating means, and multiplexing at least two of the outputs from said optical signal generating means, said optical device, and said multiplexing means, depending on which of said positions it is disposed at;

a second optical device having first to third ports, wherein a first port is connected to the output of said second multiplexing means, a second port outputs light inputted to said first port, and a third port outputs light inputted to said second port;

a second dispersion compensating device connected to said second port of said second optical device, and having a predetermined dispersion value; and second polarization converting means for receiving an input of said polarized light outputted from said second dispersion compensating device, rotating said polarized light outputted from said second dispersion compensating device, and inputting the polarized light again to said second dispersion compensating device.

13. An optical sending apparatus according to claim 1, wherein said polarization converting means includes:

a Faraday rotator and a mirror operating together to rotate said polarized light outputted from said dispersion compensating device.

14. An optical sending apparatus comprising:

a plurality of optical signal generating means for outputting polarized light having mutually different wavelengths;

dispersion compensating means connected to at least one of said plurality of optical signal generating means, for performing compensation with a predetermined chromatic dispersion value to polarized light outputted from said optical signal generating means while maintaining the state of said polarized light, and outputting said dispersed polarized light; and multiplexing means for receiving said polarized light outputted from said dispersion compensating means and said polarized light outputted from said optical signal generating means without any of the polarized light having been multiplexed with other of the polarized light, and for multiplexing said received polarized light outputted from said dispersion compensating means with said received polarized light outputted from said optical signal generating means or multiplexing mutually said received polarized light outputted from said optical signal generating means, said polarized light input to and output from the multiplexing means having adjacent wavelengths crossing orthogonal to each other, wherein said dispersion compensating means includes:

an optical device having first to third ports, wherein a first port is connected to said optical signal generating means, a second port outputs light inputted to said first port, and a third port outputs light inputted to said second port, a dispersion device connected to said second port of said optical device, and having a predetermined dispersion value, and a polarization converter receiving an input of said polarized light outputted from said dispersion device, rotating said polarized light outputted from said dispersion device and inputting the polarized light again to said dispersion device.

15. An optical sending apparatus according to claim 14, wherein said polarization converter rotates the output of said dispersion device by approximately 90 degrees and inputs it again to said dispersion device.

16. An optical sending apparatus according to claim 14, wherein an optical amplifier is interposed between said optical device and said polarization converter.

17. An optical sending apparatus according to claim 14, wherein a band-pass filter is interposed between said optical device and said polarization converter.

18. An optical sending apparatus according to claim 14, wherein an optical attenuator is interposed between said optical device and said polarization converter.

19. An optical sending apparatus according to claim 14, wherein an optical amplifier capable of maintaining polarization is interposed between said optical device and said multiplexing means.

20. An optical sending apparatus according to claim 14, wherein an optical attenuator capable of maintaining polarization is interposed between said optical device and said multiplexing means.

21. An optical sending apparatus according to claim 14, wherein a polarizer capable of maintaining polarization is interposed between said optical device and said multiplexing means.

22. An optical sending apparatus according to claim 14, wherein a plurality of said optical signal generating means are all connected to said optical device, and said multiplexing means multiplexes the output from said third port of said optical device.

23. An optical sending apparatus comprising:
    optical signal generators producing polarized lights, respectively, the polarized lights having mutually different wavelengths;
    a multiplexer receiving each of the polarized lights without having been multiplexed with other of the polarized lights, and multiplexing together the received polarized lights, to thereby produce a multiplexed light; and
    for at least one respective polarized light of the polarized lights, before being multiplexed by the multiplexer, a dispersion compensator performing compensation with a predetermined chromatic dispersion value to the respective polarized light while maintaining a polarization state of the respective polarized light, so that, in the multiplexed light, polarized lights with adjacent wavelengths have polarizations which are orthogonal to each other.

24. An optical sending apparatus according to claim 23, wherein the dispersion compensator comprises:
    an optical device having first, second and third ports, light received in the first port being output from the second port, light received in the second port being output from the third port, the respective polarized light being input to the first port and thereby being output from the second port;
    a dispersion compensating device receiving the respective polarized light output from the second port of the optical device, and performing compensation with a predetermined dispersion value to the received, respective polarized light, to thereby produce a dispersion compensated polarized light; and
    a polarization converter rotating the dispersion compensated polarized light, and inputting the rotated polarized light again to the dispersion compensating device.

25. An optical sending apparatus according to claim 24, further comprising:
    a polarizer, capable of maintaining polarization, interposed between the optical device and the multiplexer.

26. An optical sending apparatus according to claim 24, wherein a respective dispersion compensator is provided for each of the polarized lights.

27. An optical sending apparatus according to claim 24, wherein the optical device is a polarization beam splitter.

28. An optical sending apparatus according to claim 24, wherein the optical device is an optical circulator.

29. An optical sending apparatus according to claim 24, wherein the polarization converter rotates the dispersion compensated polarized light by approximately 90 degrees.

30. An optical sending apparatus according to claim 24, further comprising:
    an optical amplifier interposed between the optical device and the polarization converter.

31. An optical sending apparatus according to claim 24, further comprising:
    a band-pass filter interposed between the optical device and the polarization converter.

32. An optical sending apparatus according to claim 24, further comprising:
    an optical attenuator interposed between the optical device and the polarization converter.

33. An optical sending apparatus according to claim 24, further comprising:
    an optical amplifier, capable of maintaining polarization, interposed between the optical device and the multiplexer.

34. An optical sending apparatus according to claim 24, further comprising:
    an optical attenuator, capable of maintaining polarization, interposed between the optical device and the multiplexer.

35. An optical sending apparatus according to claim 23, wherein the dispersion compensator comprises:
    an optical device having first, second and third ports, light received in the first port being output from the second port, light received in the second port being output from the third port, the respective polarized light being input to the first port and thereby being output from the second port;
    a polarization dispersion device receiving the respective polarized light output from the second port of the optical device, and providing a predetermined polarization dispersion value to the received, respective polarized light, to thereby produce a polarization compensated polarized light; and
    a polarization converter rotating the polarization compensated polarized light, and inputting the rotated polarized light again to the polarization dispersion device.

36. A method comprising:
    generating optical signals with wavelengths on either a short wavelength side or a long wavelength side of a wavelength band of a wavelength-division multiplexed optical signal, wherein the wavelengths are predetermined spaces away from outer edges of the wavelength band;
    propagating a respective optical signal of the generated optical signals through a dispersion compensating fiber having a length set as to achieve a chromatic dispersion value of a half of a predetermined dispersion compensation value to be compensated;
    converting said optical signal outputted from said dispersion compensating fiber to an optical signal in a polarization condition which crosses orthogonal to that of said optical signal before being converted and is time-reversed, and then inputting it again to said dispersion compensating fiber to thereafter be output from said dispersion compensating fiber as a dispersion compensated optical signal; and
    multiplexing said dispersion compensated optical signal with said wavelength-division multiplexed optical signal so that, at an input to and output from said multiplexing, the polarization condition of said dispersion compensated optical signal crosses orthogonal to the polarization condition of an optical signal in the wavelength-division multiplexed optical signal having the closest wavelength to the wavelength of said dispersion compensated optical signal.

37. A method according to claim 36, wherein said predetermined spaces are at least 0.4 nm.

38. A method comprising:
generating, by a polarization crossing method, an optical signal with a wavelength on either a short wavelength side or a long wavelength side of a wavelength band of a wavelength-division multiplexed optical signal, the wavelength of the generated optical signal being at least twice the distance away from an outer edge of the wavelength band as a distance of each space between wavelengths in the wavelength band; and
multiplexing the generated optical signal with said wavelength-division multiplexed optical signal.

39. An optical sending apparatus comprising:
means for producing polarized lights, respectively, the polarized lights having mutually different wavelengths;
multiplexing means for receiving the polarized lights without having been multiplexed with other of the polarized lights, and for multiplexing together the received polarized lights, to thereby produce a multiplexed light; and,
for at least one respective polarized light of the polarized lights, before being multiplexed by the multiplexing means, dispersion compensating means for performing compensation with a predetermined chromatic dispersion value to the respective polarized light while maintaining a polarization state of the respective polarized light, so that, in the multiplexed light, polarized lights with adjacent wavelengths have polarizations which are orthogonal to each other.

40. A method comprising:
producing polarized lights, respectively, the polarized lights having mutually different wavelengths;
multiplexing together the polarized lights without any of the polarized lights having previously been multiplexed together, to thereby produce a multiplexed light; and
for at least one respective polarized light of the polarized lights, before being multiplexed by said multiplexing, performing compensation with a predetermined chromatic dispersion value to the respective polarized light while maintaining a polarization state of the respective polarized light, so that, in the multiplexed light, polarized lights with adjacent wavelengths have polarizations which are orthogonal to each other.

41. An optical sending apparatus comprising:
optical signal generators producing polarized lights, respectively, the polarized lights having mutually different wavelengths;
a multiplexer multiplexing together the polarized lights without any of the polarized lights having been previously multiplexed together, to thereby produce a multiplexed light; and
for a respective polarized light of the polarized lights, before being multiplexed by the multiplexer, a dispersion compensator performing compensation with a predetermined chromatic dispersion value to the respective polarized light while maintaining a polarization state of the respective polarized light, so that, in the multiplexed light, the polarization of the respective polarized light is orthogonal to the polarization of another of the polarized lights in the multiplexed light and having the closest wavelength to the wavelength of said respective polarized light.

42. A method comprising:
generating an optical signal with a wavelength on either a short wavelength side or a long wavelength side of a wavelength band of a wavelength-division multiplexed (WDM) optical signal, the wavelength of the generated optical signal being a predetermined space away from an outer edge of the wavelength band;
propagating the generated optical signal through a dispersion compensating fiber having a length set as to achieve a chromatic dispersion value of a half of a predetermined dispersion compensation value to be compensated;
converting the optical signal output from the dispersion compensating fiber to an optical signal in a polarization condition which crosses orthogonal to the polarization condition of the optical signal before being converted and is time-reversed, and then inputting the converted optical signal again to the dispersion compensating fiber to thereafter be output from the dispersion compensating fiber as a dispersion compensated optical signal; and
multiplexing the dispersion compensated optical signal with the WDM optical signal so that, at an input to and output of said multiplexing, polarization condition of the multiplexed dispersion compensated optical signal crosses orthogonal to the polarization condition of an optical signal in the WDM optical signal having the closest wavelength to the wavelength of the dispersion compensated optical signal.

43. An apparatus comprising:
means for generating an optical signal with a wavelength on either a short wavelength side or a long wavelength side of a wavelength band of a wavelength-division multiplexed (WDM) optical signal, the wavelength of the generated optical signal being a predetermined space away from an outer edge of the wavelength band;
means for propagating the generated optical signal through a dispersion compensating fiber having a length set as to achieve a chromatic dispersion value of a half of a predetermined dispersion compensation value to be compensated;
means for converting the optical signal output from the dispersion compensating fiber to an optical signal in a polarization condition which crosses orthogonal to the polarization condition of the optical signal before being converted and is time-reversed, and then inputting the converted optical signal again to the dispersion compensating fiber to thereafter be output from the dispersion compensating fiber as a dispersion compensated optical signal; and
means for multiplexing the dispersion compensated optical signal with the WDM optical signal so that, at an input to and output of said multiplexing means, polarization condition of the multiplexed dispersion compensated optical signal crosses orthogonal to the polarization condition of an optical signal in the WDM optical signal having the closest wavelength to the wavelength of the dispersion compensated optical signal.

44. A method comprising:
generating optical signals at different wavelengths from each other, the wavelengths being on either a short wavelength side or a long wavelength side of a wavelength band of a wavelength-division multiplexed (WDM) optical signal, the wavelengths of the generated optical signals being at a predetermined spacing away from an outer edge of the wavelength band;

for each of the generated optical signals,
  propagating the respective, generated optical signal through a dispersion compensating fiber having a length set as to achieve a chromatic dispersion value of a half of a predetermined dispersion compensation value to be compensated,
  converting the optical signal output from the dispersion compensating fiber to an optical signal in a polarization condition which crosses orthogonal to the polarization condition of the optical signal before being converted and is time-reversed, and then inputting the converted optical signal again to the dispersion compensating fiber to thereafter be output from the dispersion compensating fiber as a dispersion compensated optical signal, and
multiplexing the dispersion compensated optical signal with the WDM optical signal so that, at an input to and output from said multiplexing, polarization condition of the multiplexed dispersion compensated optical signal crosses orthogonal to the polarization condition of an optical signal in the WDM optical signal having the closest wavelength to the wavelength of the dispersion compensated optical signal.

45. An apparatus comprising:
means for generating optical signals at different wavelengths from each other, the wavelengths being on either a short wavelength side or a long wavelength side of a wavelength band of a wavelength-division multiplexed (WDM) optical signal, the wavelengths of the generated optical signals being at a predetermined spacing away from an outer edge of the wavelength band;
for each of the generated optical signals,
  means for propagating the respective, generated optical signal through a dispersion compensating fiber having a length set as to achieve a chromatic dispersion value of a half of a predetermined dispersion compensation value to be compensated,
  means for converting the optical signal output from the dispersion compensating fiber to an optical signal in a polarization condition which crosses orthogonal to the polarization condition of the optical signal before being converted and is time-reversed, and then inputting the converted optical signal again to the dispersion compensating fiber to thereafter be output from the dispersion compensating fiber as a dispersion compensated optical signal, and
  means for multiplexing the dispersion compensated optical signal with the WDM optical signal so that, at an input to and output of said multiplexing means, polarization condition of the multiplexed dispersion compensated optical signal crosses orthogonal to the polarization condition of an optical signal in the WDM optical signal having the closest wavelength to the wavelength of the dispersion compensated optical signal.

46. A method comprising:
providing a wavelength division multiplexed (WDM) optical signal including a plurality of wavelength multiplexed together, the plurality of wavelengths corresponding, respectively, to a plurality of channels in the WDM optical signal, and being on either a short wavelength side or a long wavelength side of a wavelength band of the WDM optical signal, the wavelengths being predetermined spaces away from outer edges of the wavelength band; and
performing channel extension by
  propagating a respective optical signal corresponding to an extended channel through a dispersion compensating fiber having a length set as to achieve a chromatic dispersion value of a half of a predetermined dispersion compensation value to be compensated,
  converting said optical signal outputted from said dispersion compensating fiber to an optical signal in a polarization condition which crosses orthogonal to that of said optical signal before being converted and is time-reversed, and then inputting it again to said dispersion compensating fiber to thereafter be output from said dispersion compensating fiber as a dispersion compensated optical signal, and
  multiplexing said dispersion compensated optical signal with the WDM optical signal so that, at an input to and output of said multiplexing, the polarization condition of said dispersion compensated optical signal crosses orthogonal to the polarization condition of an optical signal in the WDM optical signal having the closest wavelength to the wavelength of said dispersion compensated optical signal.

47. An apparatus comprising:
means for providing a wavelength division multiplexed (WDM) optical signal including a plurality of wavelength multiplexed together, the plurality of wavelengths corresponding, respectively, to a plurality of channels in the WDM optical signal, and being on either a short wavelength side or a long wavelength side of a wavelength band of the WDM optical signal, the wavelengths being predetermined spaces away from outer edges of the wavelength band; and
means for performing channel extension by
  propagating a respective optical signal corresponding to an extended channel through a dispersion compensating fiber having a length set as to achieve a chromatic dispersion value of a half of a predetermined dispersion compensation value to be compensated,
  converting said optical signal outputted from said dispersion compensating fiber to an optical signal in a polarization condition which crosses orthogonal to that of said optical signal before being converted and is time-reversed, and then inputting it again to said dispersion compensating fiber to thereafter be output from said dispersion compensating fiber as a dispersion compensated optical signal, and
multiplexing said dispersion compensated optical signal with the WDM optical signal so that, at an input to and output of said multiplexing, the polarization condition of said dispersion compensated optical signal crosses orthogonal to the polarization condition of an optical signal in the WDM optical signal having the closest wavelength to the wavelength of said dispersion compensated optical signal.

* * * * *

UNITED STATES PATENT AND TRADEMARK OFFICE
CERTIFICATE OF CORRECTION

PATENT NO. : 6,738,181 B1
DATED : May 18, 2004
INVENTOR(S) : Hiroshi Nakamoto et al.

It is certified that error appears in the above-identified patent and that said Letters Patent is hereby corrected as shown below:

<u>Title page,</u>
Item [56], References Cited, OTHER PUBLICATIONS, "Golovchenko, E.A. et al.," reference, change "Lnks" to -- Links --.

Signed and Sealed this

Thirty-first Day of August, 2004

JON W. DUDAS
*Director of the United States Patent and Trademark Office*